United States Patent
Kidouchim

(10) Patent No.: US 8,832,904 B2
(45) Date of Patent: Sep. 16, 2014

(54) EYE WEAR HINGE AND PROCESS FOR ASSEMBLY

(71) Applicant: Armand Kidouchim, Calabasas, CA (US)

(72) Inventor: Armand Kidouchim, Calabasas, CA (US)

( * ) Notice: Subject to any disclaimer, the term of this patent is extended or adjusted under 35 U.S.C. 154(b) by 0 days.

(21) Appl. No.: 14/017,753

(22) Filed: Sep. 4, 2013

(65) Prior Publication Data

US 2014/0059803 A1 Mar. 6, 2014

Related U.S. Application Data

(60) Provisional application No. 61/696,469, filed on Sep. 4, 2012.

(51) Int. Cl.
*G02C 5/22* (2006.01)

(52) U.S. Cl.
CPC .............. *G02C 5/22* (2013.01); *G02C 2200/06* (2013.01); *G06C 5/2209* (2013.01); *G02C 2200/08* (2013.01)
USPC ................................. 16/228; 16/320; 351/116

(58) Field of Classification Search
USPC ................... 16/228, 229, 262, 263, 268, 320; 351/113, 114, 111, 121, 153, 118, 119, 351/116
See application file for complete search history.

(56) References Cited

U.S. PATENT DOCUMENTS

| | | | |
|---|---|---|---|
| 2,671,379 A * | 3/1954 | Eloranta | 351/111 |
| 3,156,756 A * | 11/1964 | Seaver | 351/153 |
| 3,264,678 A | 8/1966 | Parmelee | |
| 3,287,760 A | 11/1966 | Moore | |
| 3,610,460 A * | 10/1971 | Siklos et al. | 220/315 |
| 4,699,479 A * | 10/1987 | Metcalfe | 351/153 |
| 4,968,129 A * | 11/1990 | Grendol | 351/153 |
| 5,818,568 A | 10/1998 | Onaga et al. | |
| 6,464,354 B1 * | 10/2002 | Chen et al. | 351/120 |
| 6,678,919 B1 * | 1/2004 | Sokolov et al. | 16/266 |
| 6,869,180 B1 | 3/2005 | Kidouchim | |
| 6,939,003 B2 | 9/2005 | Kidouchim | |
| 7,029,115 B2 * | 4/2006 | Toulch | 351/153 |
| 7,229,168 B2 | 6/2007 | Kidouchim | |
| 7,422,323 B2 | 9/2008 | Saitoh et al. | |
| 7,703,914 B2 | 4/2010 | Maling | |
| 7,794,080 B2 | 9/2010 | Zelazowski | |
| 7,938,553 B1 | 5/2011 | Beiner | |

(Continued)

FOREIGN PATENT DOCUMENTS

| | | | |
|---|---|---|---|
| EP | 0702803 A1 | 3/1996 | |
| EP | 1319971 A1 | 6/2003 | |

(Continued)

*Primary Examiner* — Chuck Mah
(74) *Attorney, Agent, or Firm* — Kelly & Kelley LLP

(57) ABSTRACT

An eyewear hinge having a lens mount and a hinge support, wherein a post from the hinge support engages a hinge receiver on the lens mount. The lens mount has a security slot that is configured to receive and engage a security ledge on the hinge support. Engagement of the security ledge by the security slot provides for secure retention of the hinge support by the lens mount without the use of screws or tight, friction fit pins. The security ledge and the security slot may include mating ridges and/or grooves on their top and/or bottom surfaces which act as threads to provide a threaded engagement of the ledge with the slot. The eyewear hinge may also include magnets configured to snap the hinge support into particular angles of rotation.

25 Claims, 29 Drawing Sheets

(56) References Cited

U.S. PATENT DOCUMENTS

| | | |
|---|---|---|
| 8,177,360 B2 | 5/2012 | Sierra et al. |
| 8,292,427 B2 | 10/2012 | Zelazowski |
| 2003/0076475 A1* | 4/2003 | Meiler ................ 351/111 |
| 2011/0109872 A1* | 5/2011 | Chen .................. 351/116 |
| 2011/0157542 A1* | 6/2011 | Tsai ................... 351/116 |
| 2011/0225707 A1 | 9/2011 | Millios |
| 2012/0062831 A1 | 3/2012 | Sierra et al. |
| 2013/0003013 A1 | 1/2013 | Collins et al. |
| 2013/0033675 A1 | 2/2013 | Cheong |
| 2013/0141689 A1 | 6/2013 | Calilung et al. |
| 2013/0242251 A1* | 9/2013 | Austin ................ 351/116 |

FOREIGN PATENT DOCUMENTS

| | | |
|---|---|---|
| EP | 1489452 A1 | 12/2004 |
| EP | 1584968 A1 | 10/2005 |
| EP | 1759235 A2 | 3/2007 |
| WO | 2013003147 A1 | 1/2013 |

\* cited by examiner

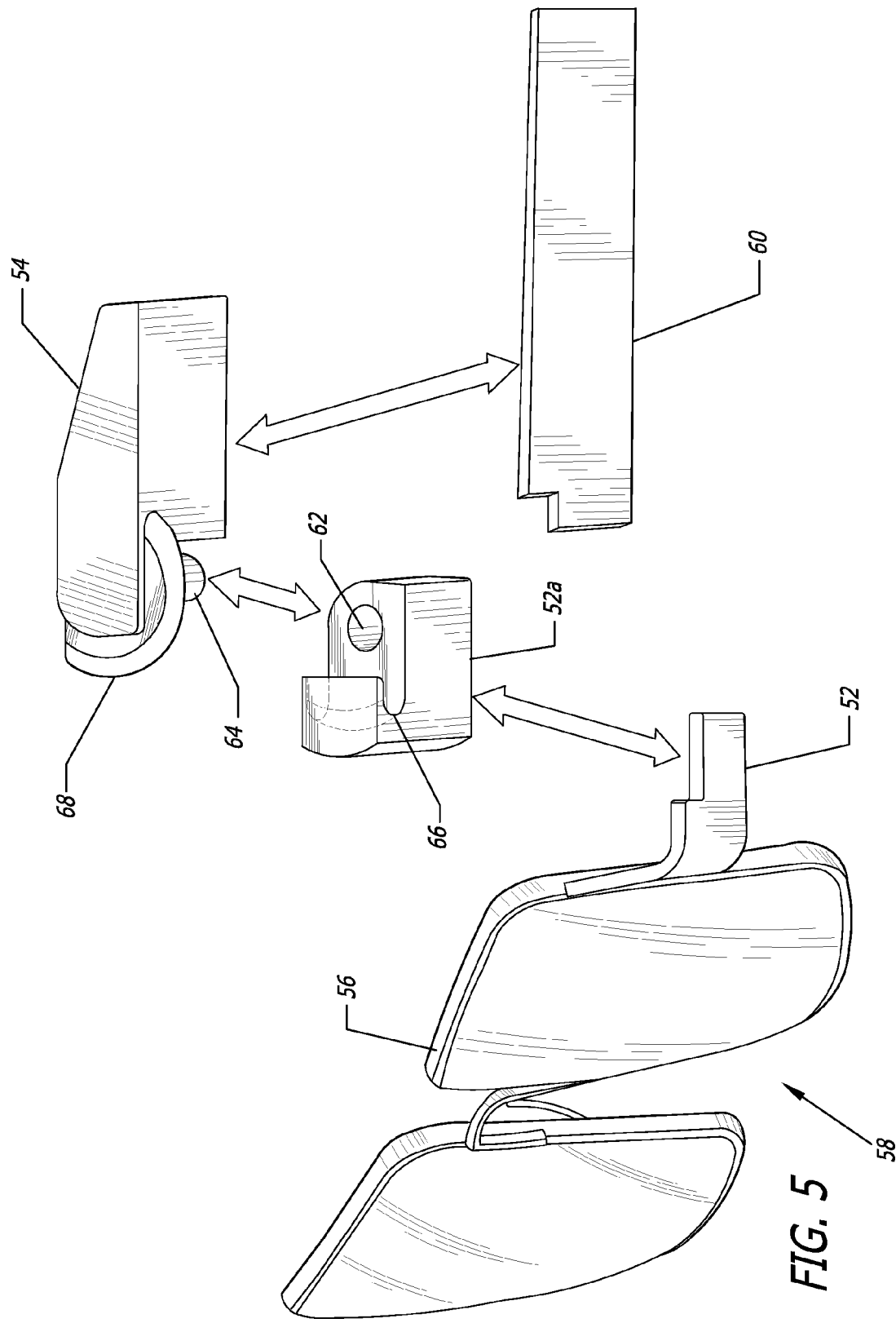

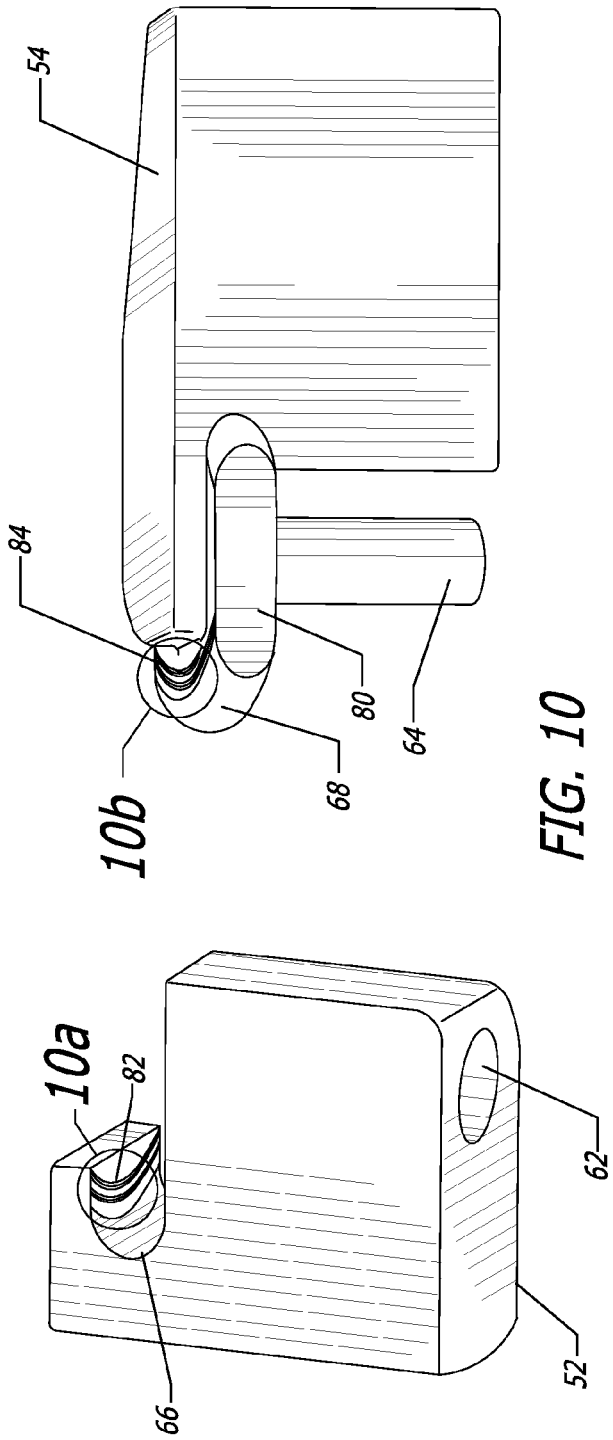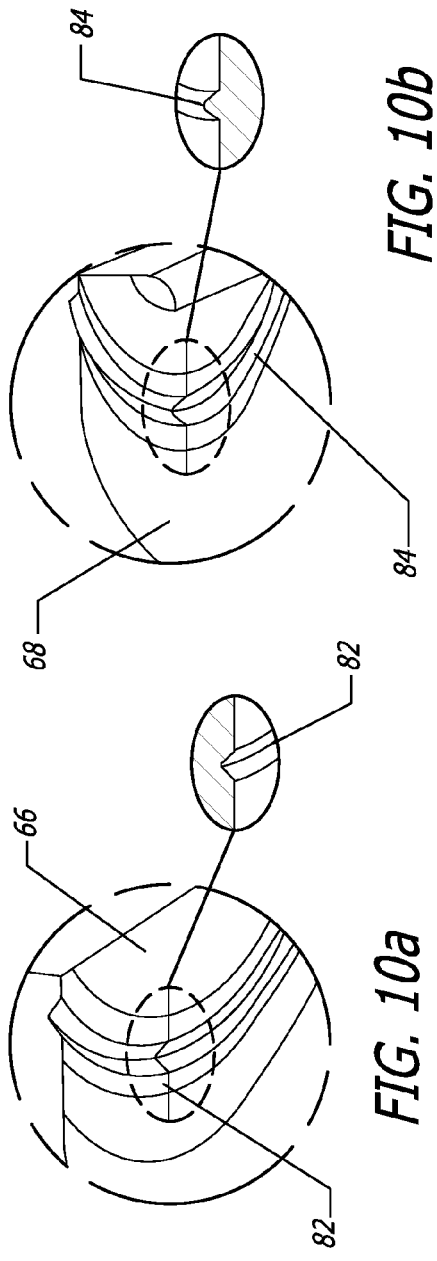

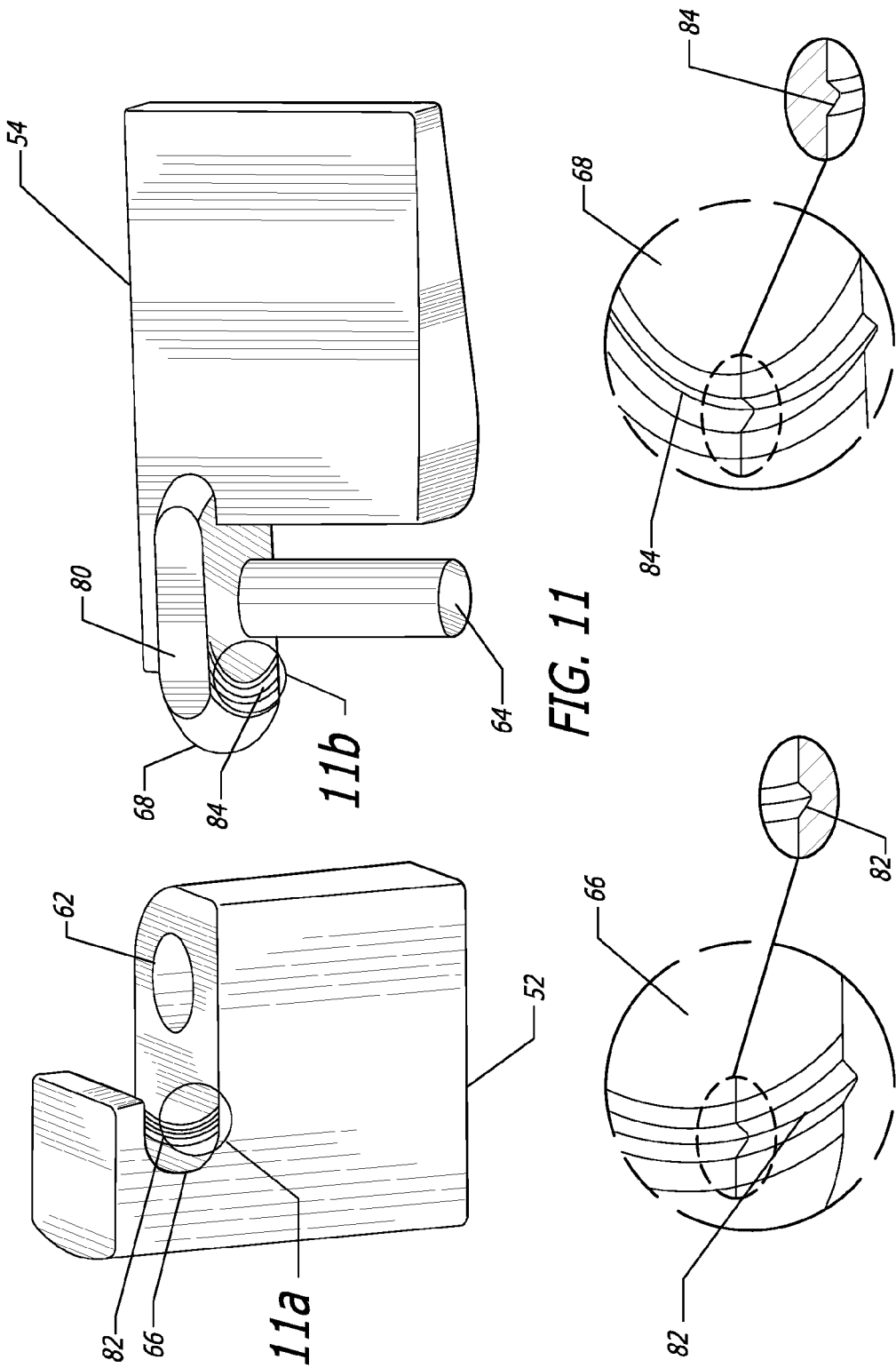

EYE WEAR HINGE AND PROCESS FOR ASSEMBLY

BACKGROUND OF THE INVENTION

The present invention is directed to an improved and more easily assembled hinge. In particular, the present invention is directed to small hinges as may be found on jewelry or small cases. More particularly, the present invention is directed to hinges found on eyeglasses connecting the earpiece to the lens frame.

A typical hinge involves two separate pieces that are joined to create a pivot point. Large hinges are commonly found on doors, gates and crates. Smaller hinges are used on brief cases, personal electronics and food containers. The smallest hinges can be found on jewelry and eyeglasses. Most such hinges typically have interweaved eyelets held together by a pin or a screw passed through the aligned eyelets. The screw provides a threaded connection and the pin typically provides a snug or friction fit connection. Other types may have a hinge receiver affixed to a first piece and a hinge post attached to a second piece, where the hinge post is simply inserted into the hinge receiver without any means of securing the same. These latter types of hinges are generally used for sturdier hinges where the weight of the second piece is sufficient to retain the hinge post in the hinge receiver.

Small hinges, such as on jewelry and eyeglasses, are usually held together by tiny screws and are very fragile. These screws frequently become overly loose and even fall out. It is particularly problematic when the screw falls out of a pair of eye glasses. If a pair of eye glasses falls apart while the wearer is operating a car, the resulting situation can be very dangerous.

Additionally, such small hinges as are found in eye glasses are very difficult to manufacture. Manufacturing eye glasses is a process that requires a large number of operations, a high level of expertise, and a lot of time. Then, if the finished pair of eye glasses later falls apart, repair is just as time consuming and difficult; especially if attempted by a lay-person.

Dealing with the tiny hinges, screws and assemblies in eye glasses will become a growing problem in the near future as augmented reality technology becomes more widely available to the public. Augmented reality technology turns a normal pair of eye glasses into a view screen for computing, telecommunications, internet browsing, and more. Processors, power supplies, and connectors for this technology will be housed in the ear pieces of a pair of glasses, thus a technology upgrade or repair will require taking the eye glasses apart and putting them back together.

Accordingly, there is a need for a hinge that can be configured for use in products, like eye glasses, that has no parts that will loosen and fall out over time. There is also a need for a hinge that is easy to assemble and disassemble, even for a person with little manufacturing training. The present invention fulfills these needs and provides other related advantages.

SUMMARY OF THE INVENTION

The present invention is directed to an eyewear hinge for removably connecting an earpiece to a lens frame on eyewear. The eyewear hinge includes a lens mount configured for fixed attachment to the lens frame and having a hinge receiver and a security slot. A pivoting hinge support is configured for fixed attachment to the earpiece. The hinge support has a hinge post configured so as to be inserted into the hinge receiver and a security ledge configured to be received in and engaged with the security slot as the hinge support pivots between a closed position and an open position for the eyewear hinge.

The security ledge disengages from the security slot when the hinge support is pivoted to a removal position. The removal position corresponds to a discontinuity in the security ledge such that the security ledge is no longer received in or engaged with the security slot. The discontinuity in the security ledge may be configured such that the removal position is between the closed position and the open position, beyond the open position, or in another position in the arc of the pivoting rotation of the hinge support relative to the lens mount. The security ledge is generally disc-shaped and may have a flattened external edge such that the security ledge does not protrude beyond an outer edge of the earpiece attached to the hinge support.

The security ledge and security slot may have engaging ridges and grooves on facing surfaces so as to securely retain the security ledge within the security slot. The engaging ridges and grooves may be inclined in their engagement from the closed position to the open position so as to exert a securing force on the security ledge in the security slot. The engaging ridges and grooves may be on both top and bottom surfaces of the security ledge and the security slot, or may be provided on only one of the top or bottom surfaces.

The security ledge may have a generally T-shaped cross-section and the security slot may have a matching generally T-shaped cross-section.

A first magnet cartridge may be included in the lens mount adjacent to the hinge receiver and a second magnet cartridge may be included in the hinge post of the hinge support. The first and second magnet cartridges are preferably configured such that opposite polarity poles are adjacent when the hinge support is in the open position.

The eyewear hinge may include a first means for locking the first magnet cartridge in a predetermined rotational orientation, as well as, a second locking means for locking the second magnet cartridge in an opposite predetermined rotational orientation. The first and second means for locking may be locking slots on the first and second magnet cartridges and matching locking slots on the lens mount and hinge support, both the locking slots and the matching locking slots receive a locking insert. When inserted into the locking slots and matching locking slots, the locking insert prevents rotation of the first magnet cartridge with respect to the lens mount and the second magnet cartridge with respect to the hinge support.

Alternatively, the locking means may be a first set pin extending through the lens mount and engaging a first set hole on the first magnet cartridge, and a second set pin extending through the hinge support and engaging a second set hole on the second magnet cartridge. The first and second set pins are screws engaging threads in the first and second set holes.

A third magnet cartridge may be disposed in the lens mount such that the first magnet cartridge and the third magnet cartridge are on opposite sides of the hinge receiver. The first and second magnet cartridges are rotationally configured such that poles of opposite polarity are adjacent to one another when the hinge support is in the open position, and the second and third magnet cartridges are rotationally disposed such that poles of opposite polarity are adjacent to one another when the hinge support is in the open position.

The eyewear hinge may include a fourth magnet cartridge disposed in the lens mount such that the first magnet cartridge is disposed on a first side of the hinge receiver and the third and fourth magnet cartridges are disposed adjacent to one another generally on an opposite second side of the hinge receiver. The first and second magnet cartridges are preferably rotationally configured such that poles of opposite polarity are adjacent to one another when the hinge support is in the open position. The third and fourth magnet cartridges are rotationally disposed with respect to one another such that poles of identical polarity on the third and fourth magnet cartridges are generally adjacent to one another. The third and fourth magnet cartridges are further rotationally disposed with respect to the second magnet cartridge such that the poles of identical polarity on the third and fourth magnet cartridges are generally adjacent to the pole of opposite polarity on the second magnet cartridge when the hinge support is in the open position.

In an alternate embodiment, a first magnet cartridge may be disposed in the lens mount and a second magnet cartridge may be disposed in the hinge support. In this embodiment, the first and second magnet cartridges are generally superposed when the hinge support is in the open position. The first and second magnet cartridges are oriented such that poles having opposite polarities are superposed when the hinge support is in the open position. The first and second magnet cartridges are generally rectangular in shape and contained within removable trays disposed within the lens mount and the hinge support.

The first and second magnet cartridges are preferably generally rectangular with a long axis disposed laterally across the lens mount and the hinge support. Alternatively, the generally rectangular first and second magnet cartridges may be disposed with a long axis longitudinally along the lens mount and the hinge support.

In another alternate embodiment, a vertical magnet may be included in the lens mount generally adjacent to the hinge receiver and a horizontal magnet may also be included in the lens mount generally beneath the hinge receiver. The hinge post is preferably hexagonal in shape and the hinge receiver is preferably square in shape. The horizontal magnet retains the hinge post in the bottom of the hinge receiver. The vertical magnet retains the hinge support in a particular rotation with respect to the lens mount through magnetic attraction of a face of the hexagonal hinge post.

The lens mount may include a secure base and a removable insert therein, the removable insert containing the hinge receiver and the security slot. The removable insert may include a chamber adjacent to the hinge receiver, the chamber configured so as to receive a magnet cartridge therein.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is an exploded view of an eyewear hinge of the present invention illustrating the relative positioning and assembly of the various components;

FIG. 6b is a top view of the hinge support of FIG. 6a;

FIG. 10 is a perspective view of a lens mount and a hinge support illustrating threaded channels and grooves;

FIG. 10a is a close-up view of the threaded channel on the lens mount;

FIG. 10b is a close-up view of the threaded ridge on the hinge support;

FIG. 11 is an alternate view of the structures in FIG. 10 showing the threaded channels and ridges on bottom surfaces of the lens mount and hinge support;

FIG. 11a is a close-up view of the threaded channel on the lens mount;

FIG. 11b is a close-up view of the threaded ridge on the hinge support;

FIG. 14b is a bottom view of the lens mount of FIG. 14a;

FIG. 15b is a bottom view of the hinge support of FIG. 15a;

FIG. 21b is a bottom view of the lens mount of FIG. 21a;

FIG. 24b is a bottom view of the lens mount of FIG. 24a;

FIG. 25 is a perspective view of a hinge support for use with the lens mount of FIG. 24a;

DETAILED DESCRIPTION OF THE PREFERRED EMBODIMENTS

Figure 1:
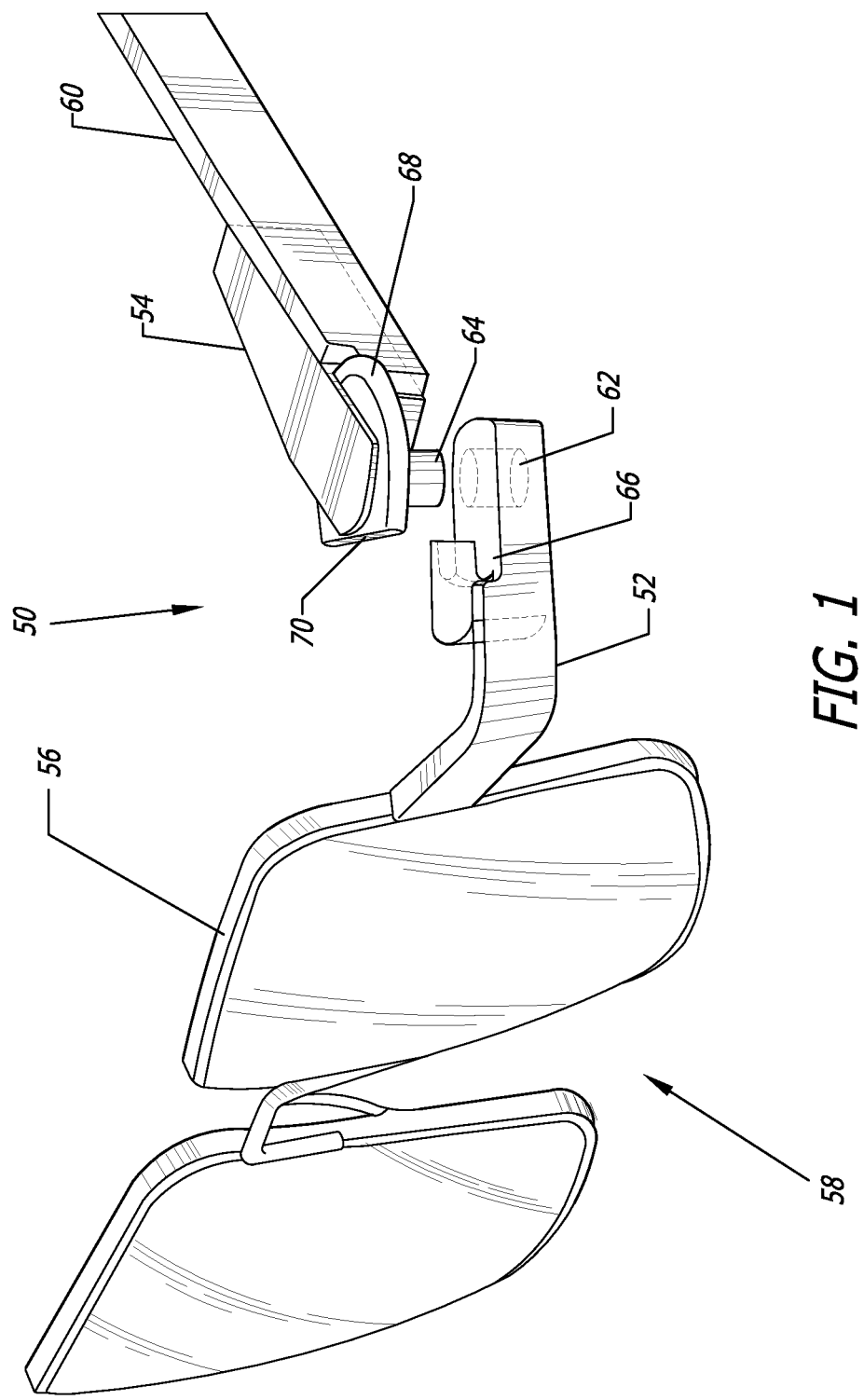
FIG. 1 is a partially exploded view of an eyewear hinge of the present invention.

The present invention is generally directed to hinges and a novel security ledge/security slot construction. The security ledge/security slot construction helps to retain the two sides of a hinge together without the use of screws or tightly fitting pins. A first part or side of the hinge includes a hinge receiver and a second part or side of the hinge includes a hinge post. The hinge post is configured to be inserted into the hinge receiver in such a manner that the second side of the hinge can freely or smoothly pivot about the first side of the hinge.

The security slot is preferably disposed on the first part of the hinge, generally above and proximate to the hinge receiver. The security ledge is preferably disposed on the second part of the hinge, generally above and co-axial with the hinge post. The security ledge and security slot are configured to engage each other through at least part of the arc of rotation of the second part of the hinge about the first part of the hinge. The engagement of the security slot and security ledge acts to retain the second part of the hinge together with the first part of the hinge, without the use of screws or tightly fitting pins. Such facilitates the assembly, disassembly, and repair of such hinges without the often time consuming or difficult task of working with screws or tightly fitting pins.

While this security ledge/security slot construction has application to many types of hinges, the following detailed description will focus on eyewear hinges and similar sized objects. This detailed description is not intended to limit the scope of this novel security ledge/security slot construction to eyewear hinges or similar devices.

The present invention is particularly directed to a novel eyewear hinge that eliminates the need for the tiny, fragile screw typically found in glasses. In particular, the present invention is directed to an eyewear hinge having a security ledge and a security slot that are mated to retain the pivoting earpiece on a lens mount. The inventive eyewear hinge may or may not include magnetic cartridges to assist in holding the earpiece on the lens mount or in a particular rotation with respect to the lens mount.

FIGS. 1-12 generally illustrate a first preferred embodiment of the inventive eyewear hinge, generally referred to by reference numeral 50. The eyewear hinge 50 generally comprises a lens mount 52 and a hinge support 54. The lens mount 52 is attached to a lens frame 56 as is typically found on a pair of glasses 58. The lens mount 52 may be permanently or removably attached to the lens frame 56 as is commonly done in this field of art. The hinge support 54 is attached to an earpiece 60. The hinge support 54 and earpiece 60 may be permanently or removably attached, or may be integrally formed as one piece. A person of ordinary skill in the art will appreciate the various forms that the hinge support 54 and earpiece 60 may take.

According to the present invention, the lens mount 52 includes a hinge receiver 62 that is configured to receive a hinge post 64 from the hinge support 54. The hinge receiver 62 and hinge post 64 are preferably configured to have a cylindrical or similar shape that permits pivotal rotation of the hinge support 54 relative to the lens mount 52. The lens mount 52 also includes a security slot 66 that is configured to receive and engage a security ledge 68 as the hinge support 54 is pivotally rotated relative to the lens mount 52.

The security slot 66 is disposed on the lens mount 52 in an area proximate to the hinge receiver 62. Preferably, the security slot 66 is disposed in an area above the hinge receiver 62 within an area representing an arc of rotation about the hinge receiver 62. In the illustrated embodiment, the security slot 66 is formed in a vertical wall adjacent to the hinge receiver 62 and that extends above the same. A person skilled in the art will realize that the structure of the security slot 66 may be configured in other ways to accomplish the same goals.

The security ledge 68 is disposed on the hinge support 54 in an area above the hinge post 64. Preferably, the security ledge 68 is disc-shaped and extends around a vertical wall on the hinge support 54 in an area above the hinge post 64. The security ledge 68 should extend into an area representing an arc of rotation of the hinge support 54 about the lens mount 52. With both the security slot 66 and security ledge 68 extending into this arc of rotation, the two components can engage and perform the intended security functions.

The security ledge 68 is generally circular or disc-shaped so as to engage the security slot 66 through a wide range of pivotal rotation. The security ledge 68 preferably includes a discontinuity or flattened portion 70 to permit attachment and/or removal of the hinge support 54 to or from the lens mount 52 without interference from the security slot 66 and the security ledge 68.

Figure 2:
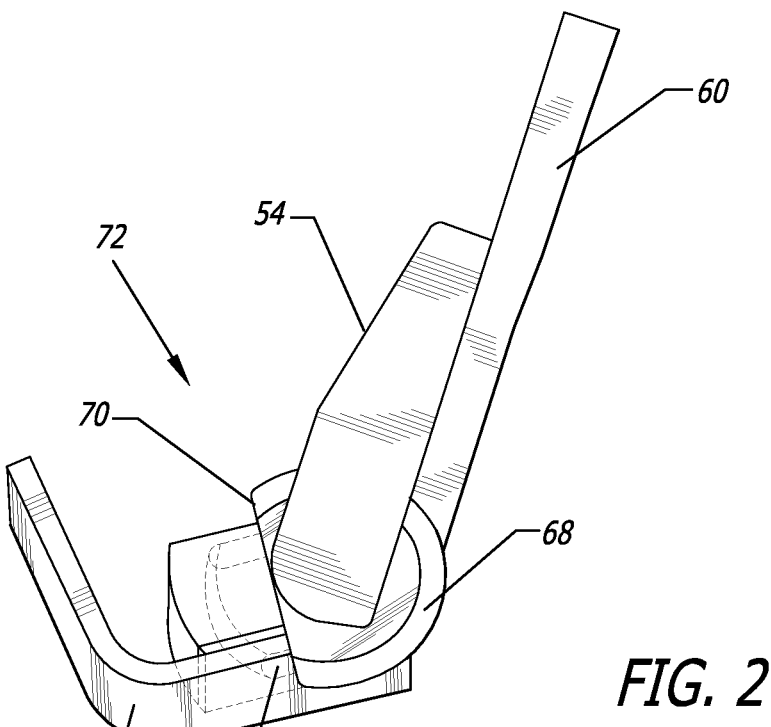
FIG. 2 is an elevated view of an eyewear hinge of the present invention, illustrating attachment of the pivoting earpiece to the lens mount.
Figure 3:
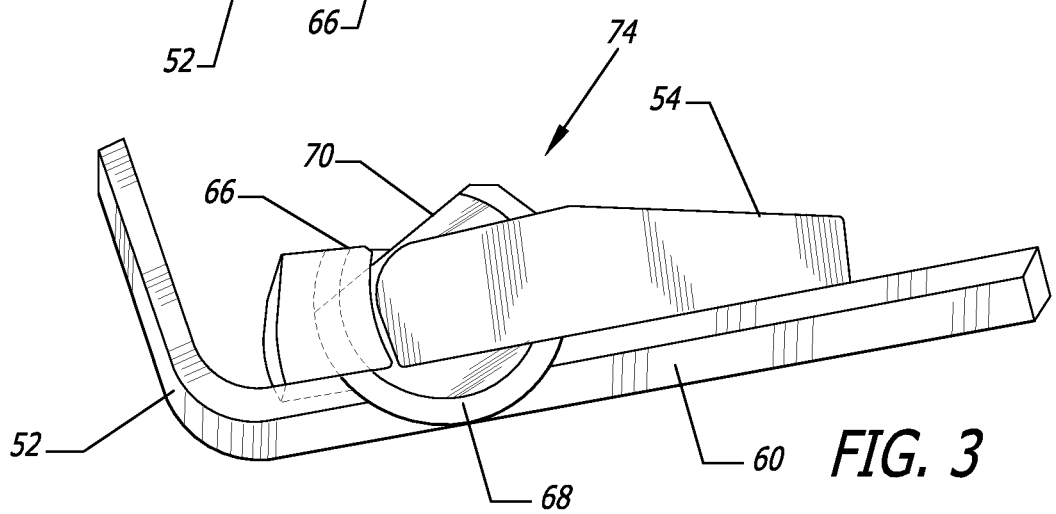
FIG. 3 is an elevated view of an eyewear hinge of the present invention, illustrating the pivoting earpiece in an open position.
Figure 4:
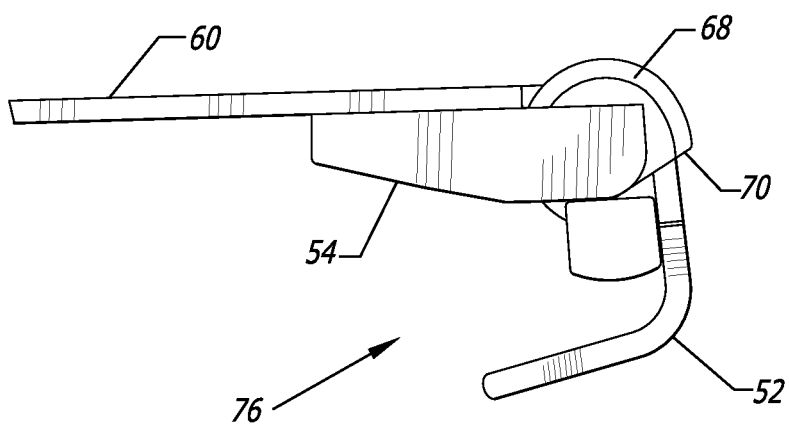
FIG. 4 is a top view of an eyewear hinge of the present invention, illustrating the pivoting earpiece in a closed position.

FIG. 2 illustrates a removal position or orientation of the hinge support 54 with respect to the lens mount 52. As illustrated, the flattened portion 70 of the security ledge 68 bypasses the security slot 66 to provide for insertion of the hinge post 64 into the hinge receiver 62. FIG. 3 illustrates an open position where the earpiece 60 is extended open such that a person may wear the glasses 58 with the earpiece 60 positioned over their ear. In this open position 74, the security ledge 68 engages the security slot 66 such that the hinge support 54 is retained flush against the lens mount 52. Similarly, FIG. 4 illustrates a closed position 66 in which the earpiece 60 is folded across the glasses 58. In this closed position 76, the security ledge 68 again engages the security slot 66 such that the hinge support 54 is retained securely against the lens mount 52.

As illustrated in FIG. 5, the lens mount 52 may include a base 52a that is removable from the lens mount 52. As with the hinge support 52 and earpiece 60, the lens mount 52 and base 52a may be permanently attached or removably attached in manners known by those skilled in the art. Where the base 52a is removable from the lens mount 52, it is preferably the base 52a that includes the hinge receiver 62 and security slot 66.

Figure 6A:
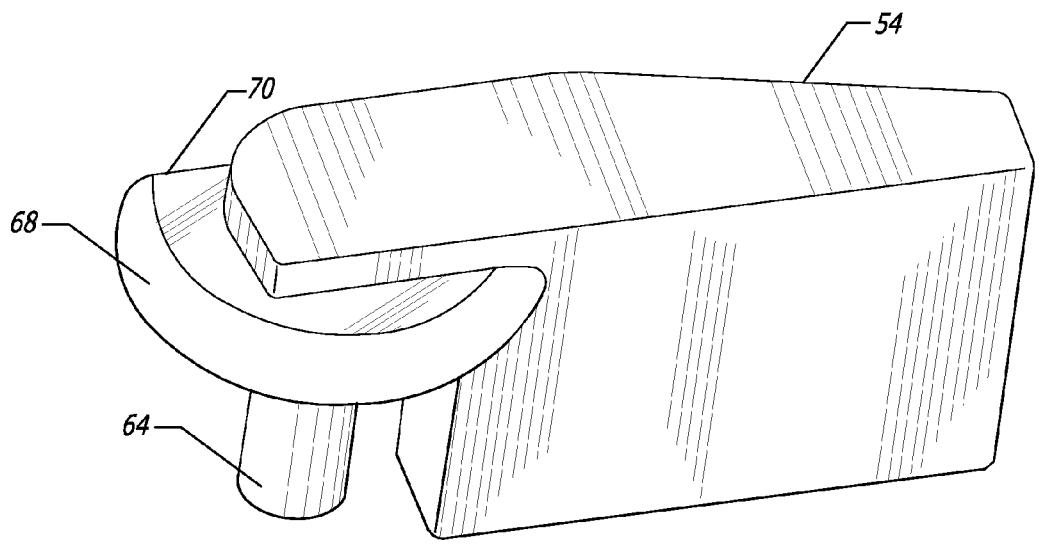
FIG. 6a is a perspective view of a preferred embodiment of a hinge support for a pivoting earpiece of an eyewear hinge of the present invention.
Figure 6B:
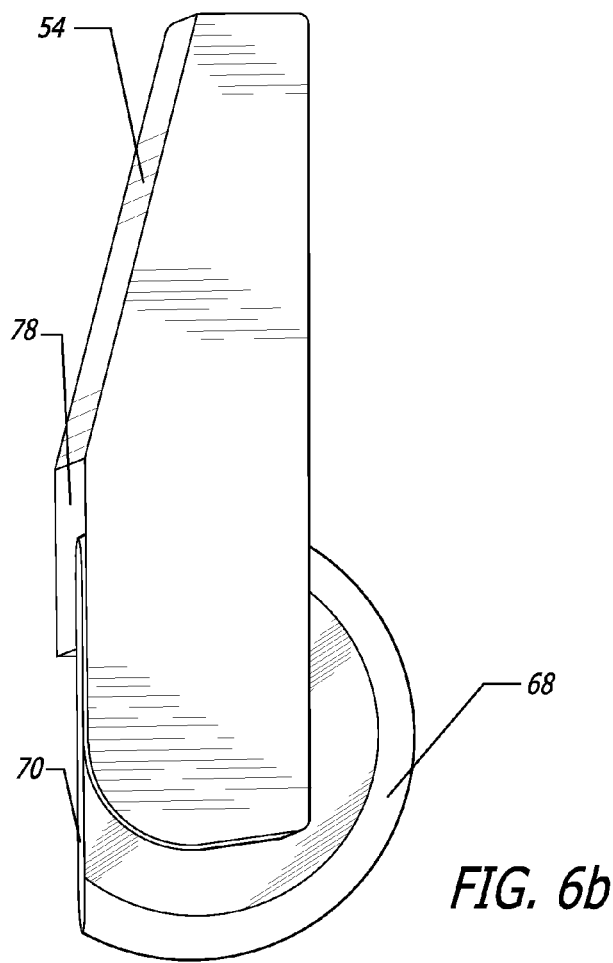
Figure 7:
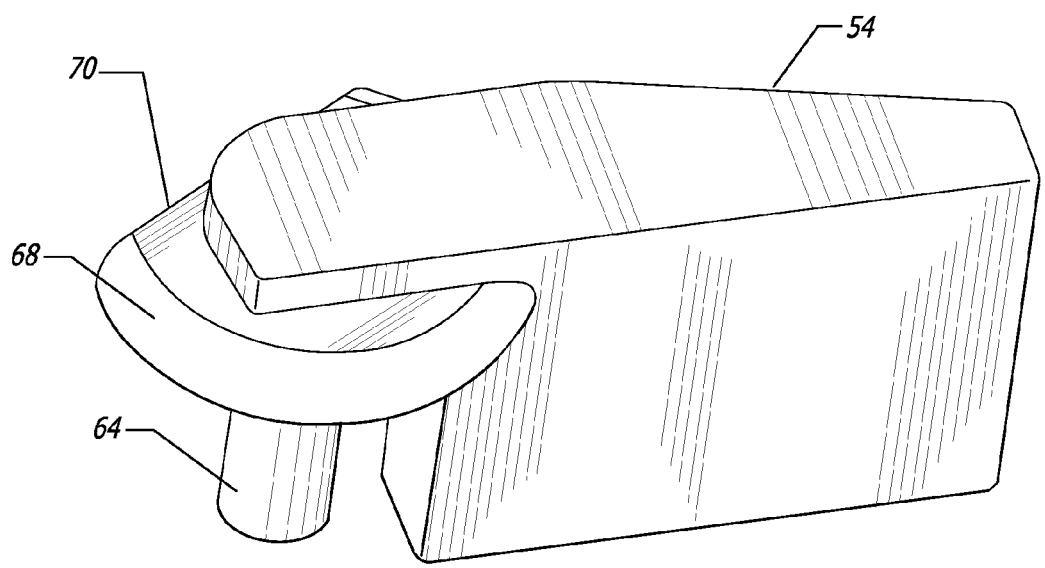
FIG. 7 is a perspective view of another preferred embodiment of a hinge support of a pivoting earpiece of an eyewear hinge of the present invention.
Figure 8:
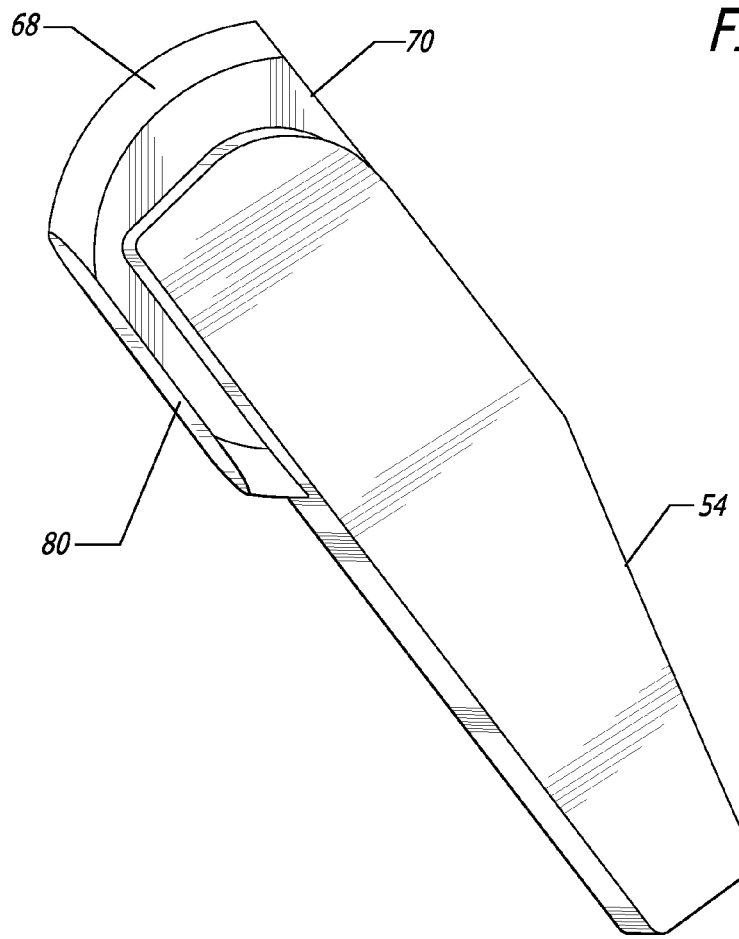
FIG. 8 is a top view of another alternate embodiment of a hinge support of a pivoting earpiece of an eyewear hinge of the present invention.
Figure 9:
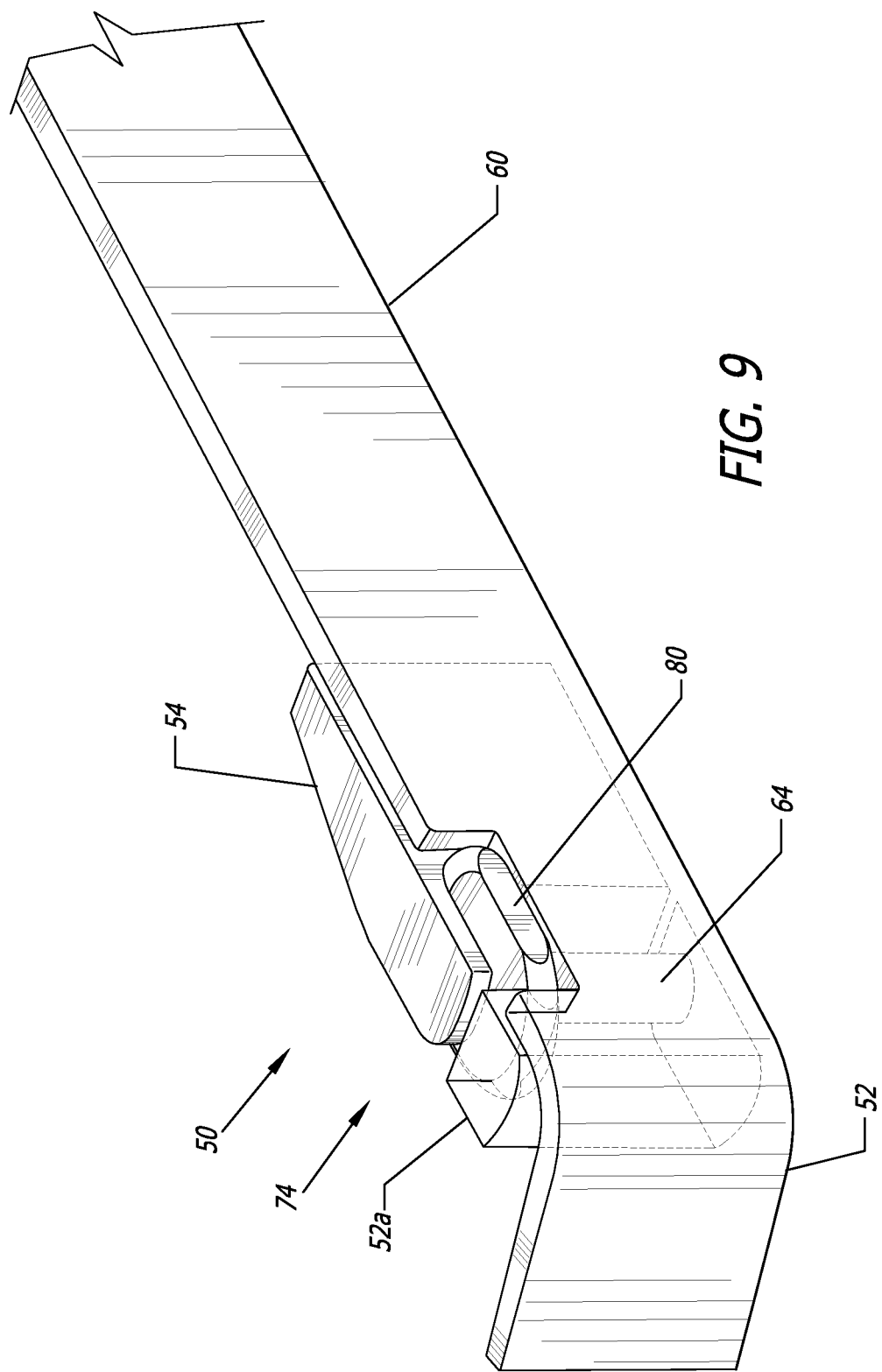
FIG. 9 is a perspective view of an assembled eyewear hinge of the present invention.

FIG. 6a illustrates an alternate configuration of the hinge support 54 wherein the security ledge 68 is rotated such that the flattened portion 70 is flush with an inside surface 78 of the hinge support 54. FIG. 6b presents an alternate view more clearly showing the flattened portion 70 flush with the inside surface 78. FIG. 7 shows a perspective view of the hinge support 54 with the flattened portion 70 partially rotated as illustrated in FIGS. 1-4. FIG. 8 illustrates another alternate embodiment of the hinge support 54 further including an outside flattened portion 80 on the security ledge 68. The purpose of this outside flattened portion 80 is so that the security ledge 68 does not protrude beyond an outside edge of the earpiece 60 when it is attached to the hinge support 54. This is clearly shown in FIG. 9 illustrating the eyewear hinge 50 in an open position 74.

FIGS. 10-11 illustrate a further variation on the security slot 66 and security ledge 68 comprising engaging ridges and grooves thereon. In particular, the security slot 66 preferably includes a groove 82 on an upper surface configured to engage a ridge 84 on an upper surface of the security ledge 68. FIGS. 10a and 10b show close-up views of the groove 82 and ridge 84 respectively. FIG. 11 illustrates a similar groove 82 and a similar ridge 84 on bottom surfaces of the security slot 66 and security ledge 68, respectively. FIGS. 11a and 11b show close-up views of the same groove 82 and ridge 84 as FIG. 11. These grooves 82 and ridges 84 may be provided in any combination of configurations, e.g., only on the top surface, only on the bottom surface, or on both the top and bottom surfaces. The grooves 82 and ridges 84 may also be replaced by mating ridges 84 on the facing surfaces of the security slot 66 and security ledge 68. The mating ridges 84 may laterally engage each other as one would be spaced adjacent to another such that adjacent faces would engage as threads on a bolt and nut combination.

In addition, the grooves 82 and ridges 84 may be slightly inclined with respect to the relative rotation arc of the hinge support 54 relative to the lens mount 52. With this slight inclination of the grooves 82 and ridges 84, the same may act as threads to exert either a pushing force or a pulling force on the hinge support 54 relative to the lens mount 52 in a direction transverse to the hinge post 64. This makes the attachment between the hinge support 54 and lens mount 52 more secure when the eyewear hinge 50 is in either the open position 74 or the closed position 76. In a variation, the grooves 82 may be disposed on the security ledge 68 and the ridges 84 may be disposed on the security slot 66.

Figure 12:
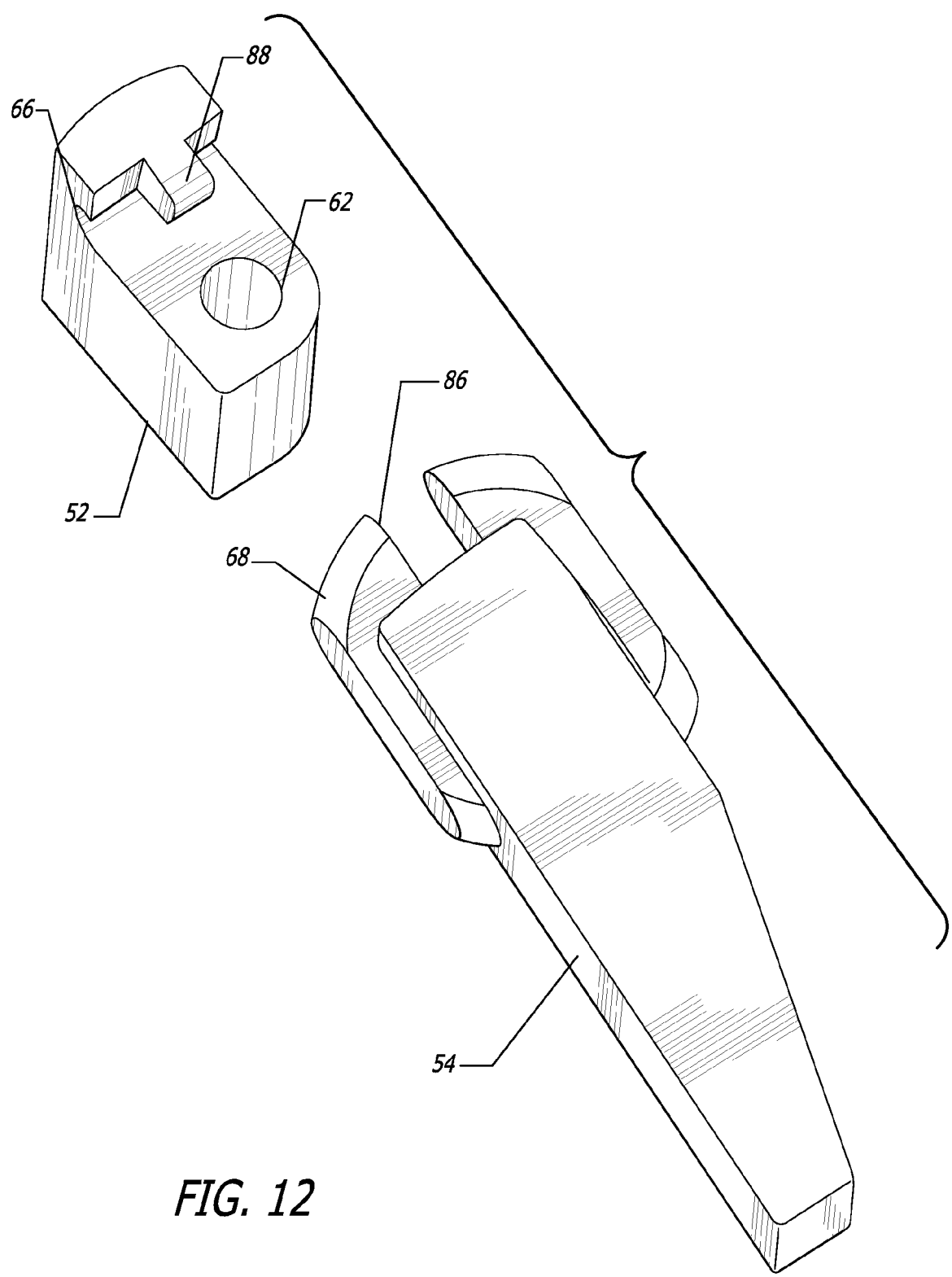
FIG. 12 is an alternate embodiment of the eyewear hinge of the present invention, illustrating a notched security ledge and security slot.
Figure 13:
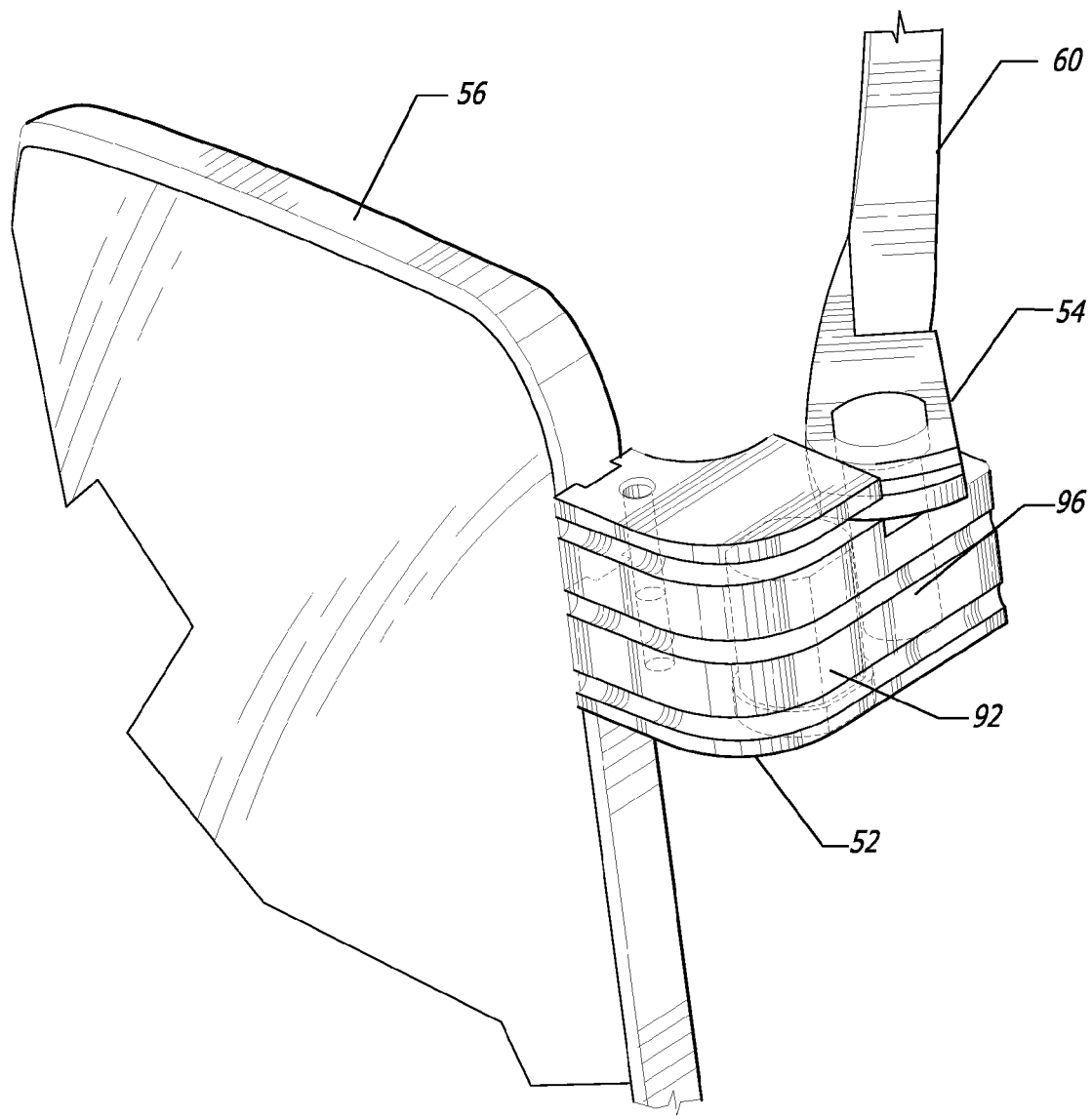
FIG. 13 is a perspective view of an alternate embodiment of an eyewear hinge of the present invention, illustrating magnetic features.
Figure 14A:
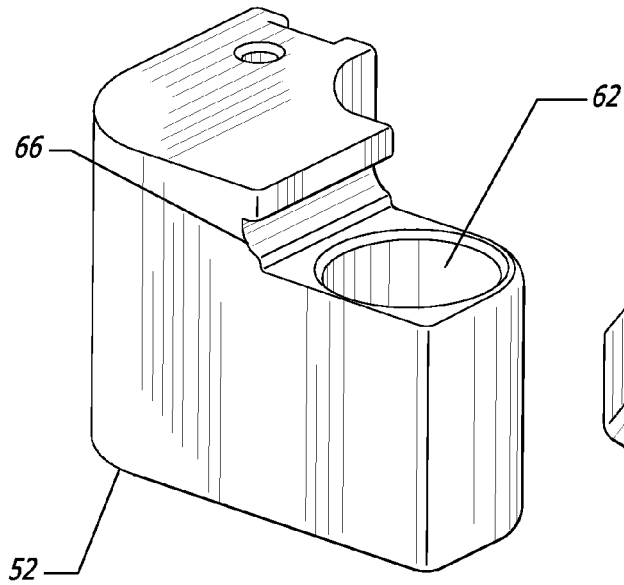
FIG. 14a is a perspective view of a lens mount of the alternate embodiment in FIG. 13.
Figure 14B:
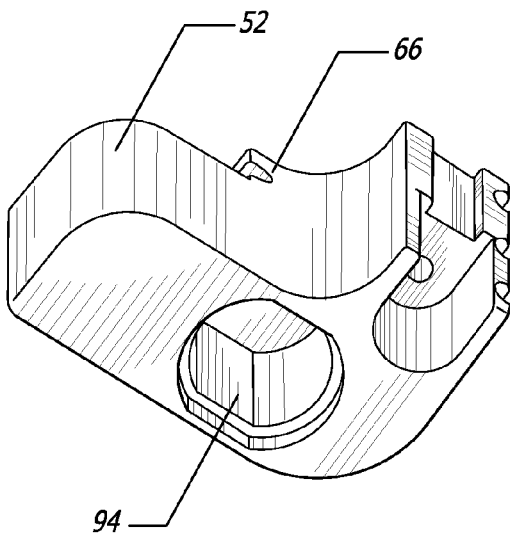
Figure 15A:
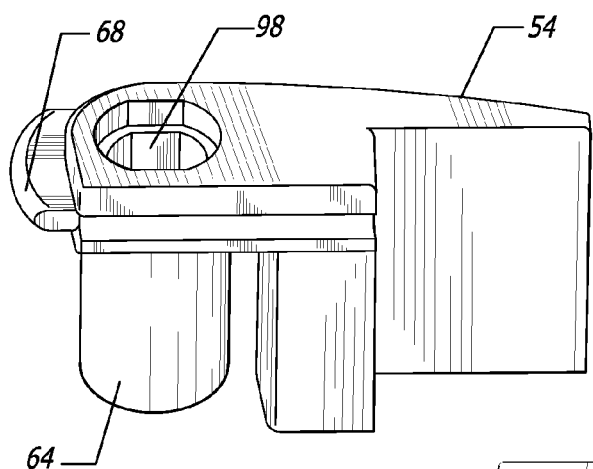
FIG. 15a is a perspective view of a hinge support of the alternate embodiment of FIG. 13.
Figure 15B:
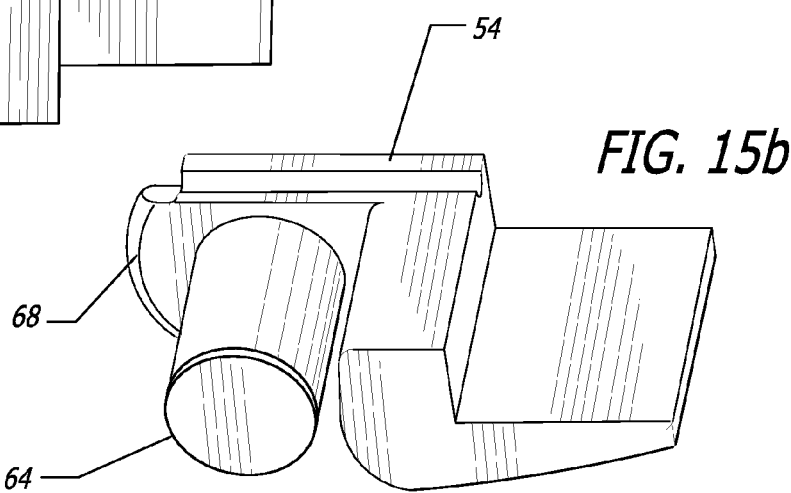
Figure 16:
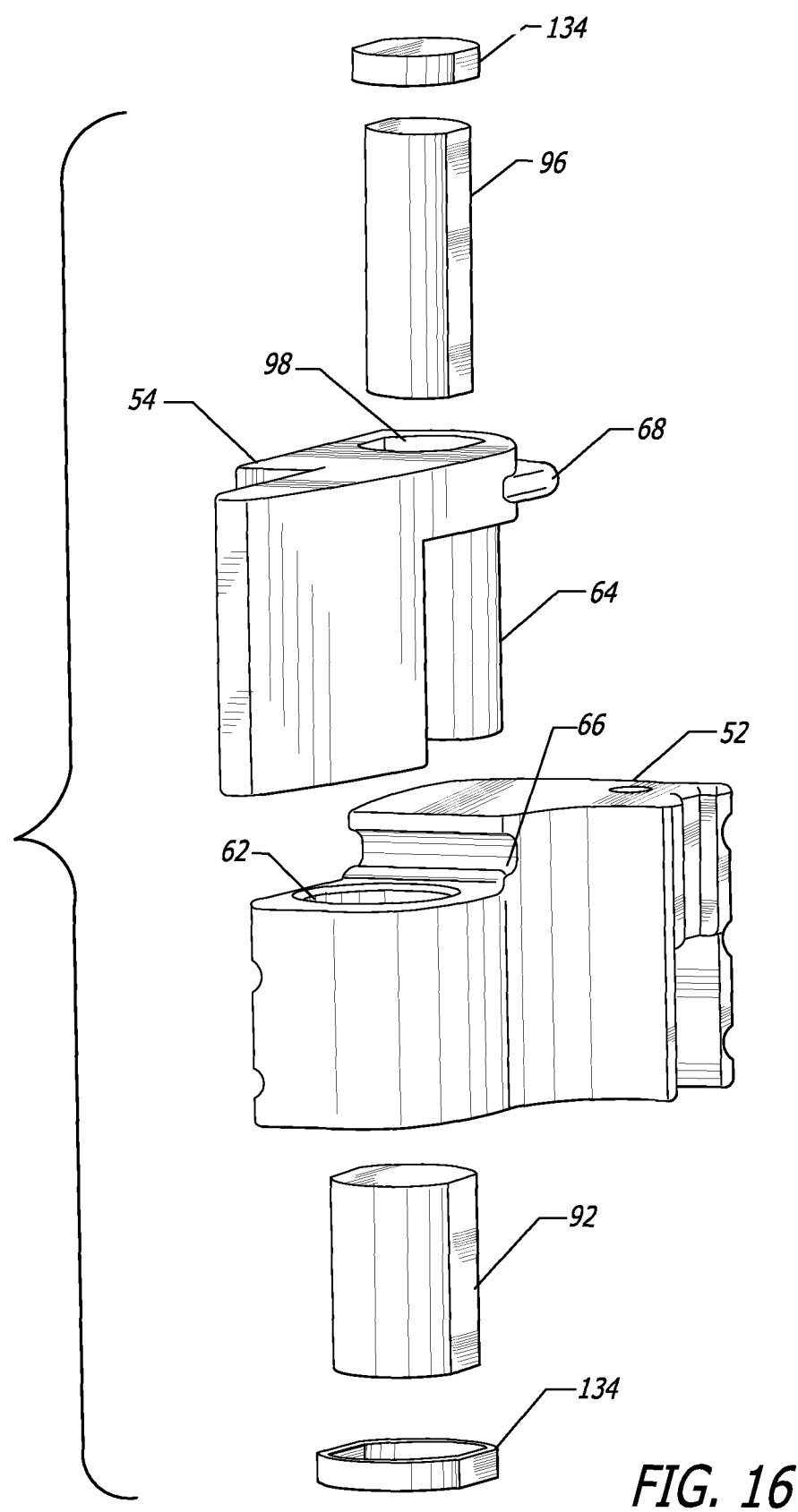
FIG. 16 is an exploded view of the eyewear hinge of the embodiment shown in FIG. 13.

FIG. 12 illustrates an alternate embodiment of the eyewear hinge 50 wherein the security ledge 68 includes a notch 86 configured to pass over a tooth 88 on the security slot 66. This notch 86 provides a different manner of retaining the hinge support 54 on the lens mount 52. The tooth 88 engages a top surface of the security ledge 68 so that the hinge support 54 may not be removed unless the notch 86 is aligned with the tooth 88. This notch 86 may be disposed in different positions around the security ledge 68 depending upon the desired rotation of the hinge support 54 for the removal position 72.

Although illustrated in various drawings, the flattened portion 70 and the outside flattened portion 80 may be included with various other embodiments without affecting the operation of the other features such as the notch 86 and tooth 88, or the grooves 82 and ridges 84.

FIGS. 13-28 generally illustrate an alternate embodiment of the inventive eyewear hinge 90. This alternate embodiment of the eyewear hinge 90 is generally constructed similar to the previous embodiment 50 but includes magnetic cartridges configured to retain the hinge support 54 and lens mount 52 engaged in particular relative rotations. The lens mount 52 includes a first magnetic cartridge 92 disposed vertically and generally adjacent to the hinge receiver 62. The first magnetic cartridge 92 is disposed in a first interior chamber 94 adjacent to and generally parallel with the hinge receiver 62. A second magnetic cartridge 96 is generally contiguous with the hinge post 64 and disposed in a second interior chamber 98 coaxially disposed within the hinge post 64. Chamber caps 134 cover each of the interior chambers 94, 98.

Figure 17:
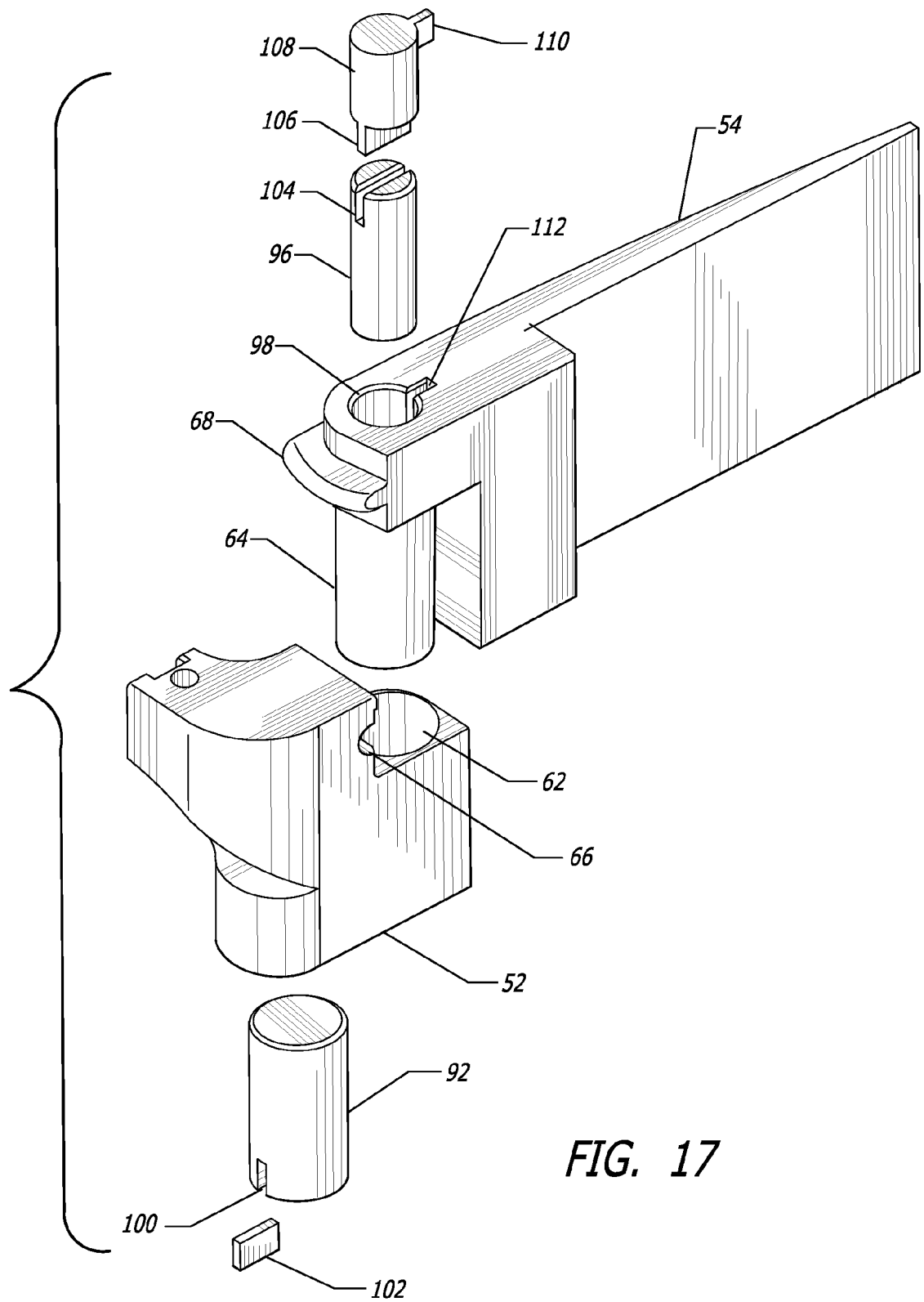
FIG. 17 is an exploded view of an alternate embodiment of the eyewear hinge shown in FIG. 13.

So that the magnetic cartridges 92, 96 do not rotate within the interior chambers 94, 98 the same may include a locking mechanism. In one preferred embodiment, as illustrated in FIG. 17, the locking mechanism may comprise matching locking slots configured to receive a locking insert. The first magnetic cartridge 92 may include a locking slot 100. This locking slot 100 is configured to receive a locking insert 102 which would also engage a matching locking slot (not shown) adjacent to an opening on the first interior chamber 94 on the underside of the lens mount 52. When this locking insert engages the locking slot 100 and the matching locking slot, the first magnetic cartridge 92 is locked in a particular angle of rotation such that it will not rotate within the first interior chamber 94.

Similarly, the second magnetic cartridge 96 includes a locking slot 104 configured to receive a locking insert 106 disposed on an underside of a hinge cap 108. The hinge cap 108 includes a locking tab 110 extending from a side thereof and configured to engage a locking notch 112 on an opening to the second interior chamber 98. The relative configurations of the locking slot 104, locking insert 106, locking tab 110, and locking notch 112 operate to hold the second magnetic cartridge 96 in a particular orientation such that it does not rotate within the second interior chamber 98. One will appreciate that the various components of this embodiment of the locking means may be configured in various forms to achieve the desired results.

Figure 18:
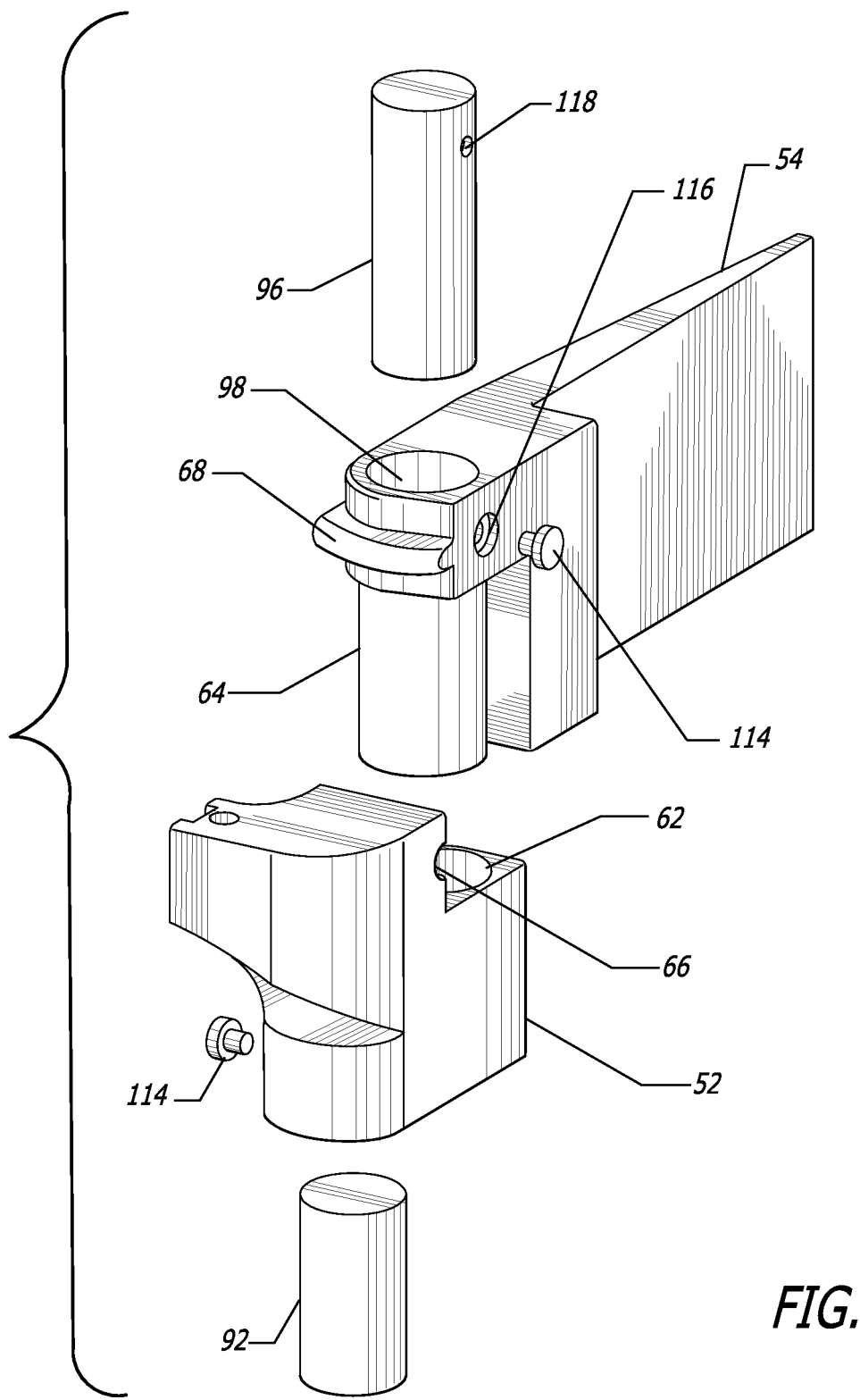
FIG. 18 is an exploded view of another alternate embodiment of the eyewear hinge of FIG. 13.

FIG. 18 illustrates another preferred embodiment of the locking mechanism, wherein set pins are used. Specifically, a set pin 114 passes through an opening 116 in a wall of the hinge support 54 so as to engage a set hole 118 in a side of the second magnetic cartridge 96. Upon engagement of the set pin 114, in the set hole 118 the second magnetic cartridge 96 will be restricted in its ability to rotate within the second interior chamber 98. The first magnetic cartridge 92 has a similar configuration to accommodate a set pin 114, an opening (not shown) and a set hole (not shown) as that described for the second magnetic cartridge 96. In this way, both magnetic cartridges 92, 96 will be locked into a particular rotation within their respective interior chambers 94, 98.

Figure 19:
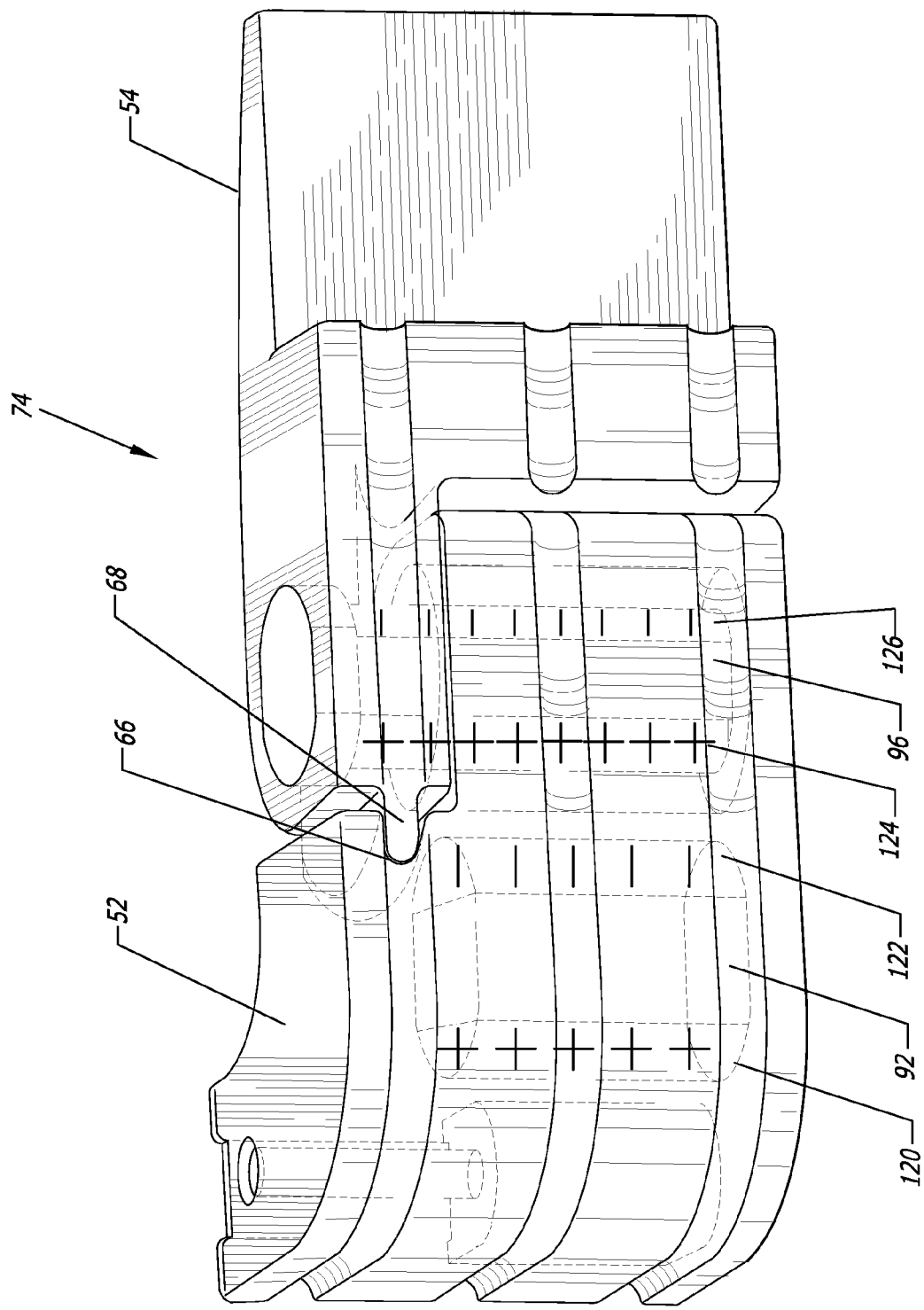
FIG. 19 is a close-up translucent view of the eyewear hinge of FIG. 13.

FIG. 19 illustrates the relative positions of the magnetic cartridges 92, 96 with regard to their respective polarities. The first magnetic cartridge 92 has a first pole 120 having a positive polarity and a second pole 122 having a negative polarity. The relative polarities of the first and second poles 120, 122 are indicated by their respective indicated signs. The second magnetic cartridge 96 has a first pole 124 having a positive polarity and a second pole 126 having a negative polarity— the polarities of the first and second poles are the same as the polarities of the first and second poles on the first magnet cartridge 92. Again, the relative polarities of the poles 124, 126 are indicated by their respective indicated signs. In a preferred embodiment, the second pole 122 of the first magnetic cartridge 92 and the first pole 124 of the second magnetic cartridge 96 have opposite polarities so as to have a magnetic attraction. This means that the first poles 120, 124 of both magnetic cartridges 92, 96 have the same polarity, as do the second poles 122, 126 of both magnetic cartridges 92, 96 have the same polarities, which are opposite to those of the first poles 120, 124. In this way, the magnetic attraction between the second pole 122 and the first pole 124 help to retain or "snap" the hinge support 54 into the open position 74 relative to the lens mount 52. The positive and negative polarities on both magnets may be swapped and still function as intended.

Figure 20:
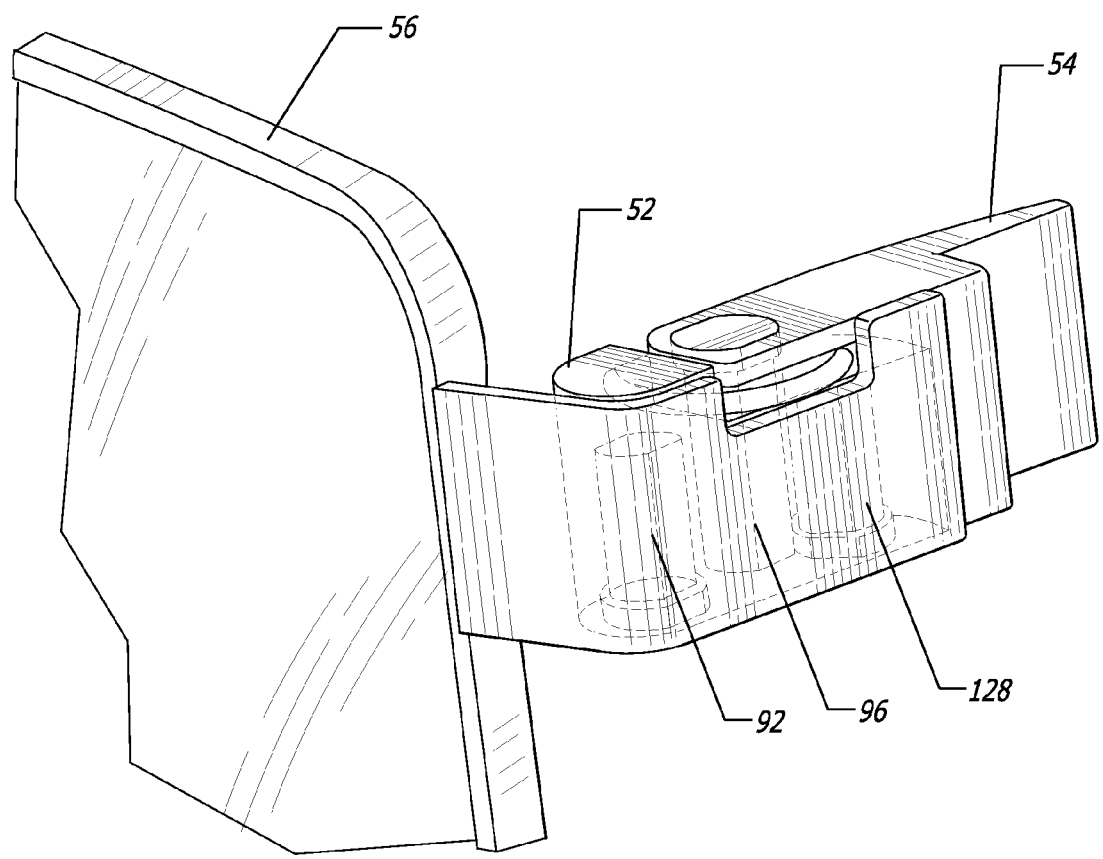
FIG. 20 is a perspective view of an alternate embodiment of the eyewear hinge of FIG. 13.
Figure 21A:
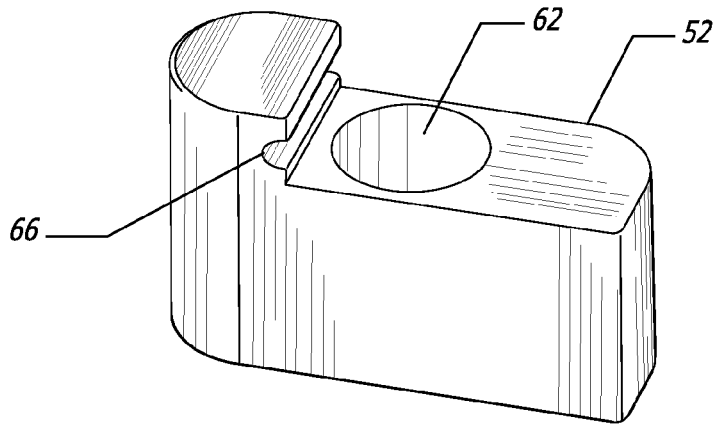
FIG. 21a is a perspective view of the lens mount of the alternate embodiment of FIG. 20.
Figure 21B:
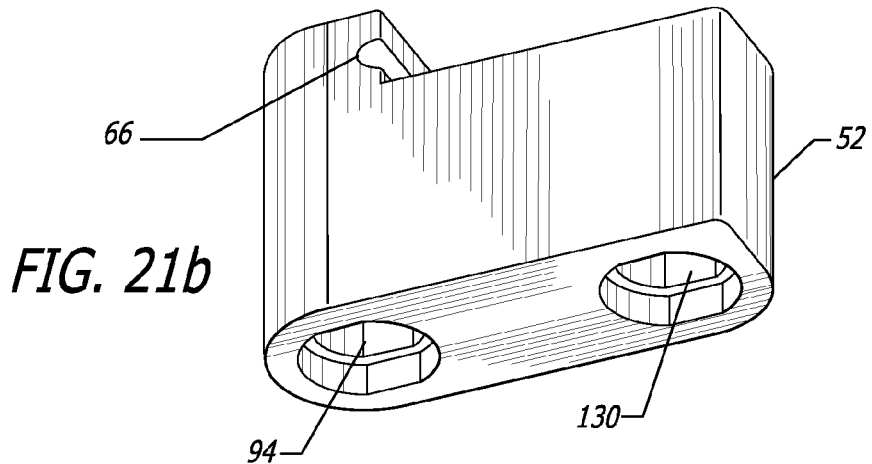
Figure 22:
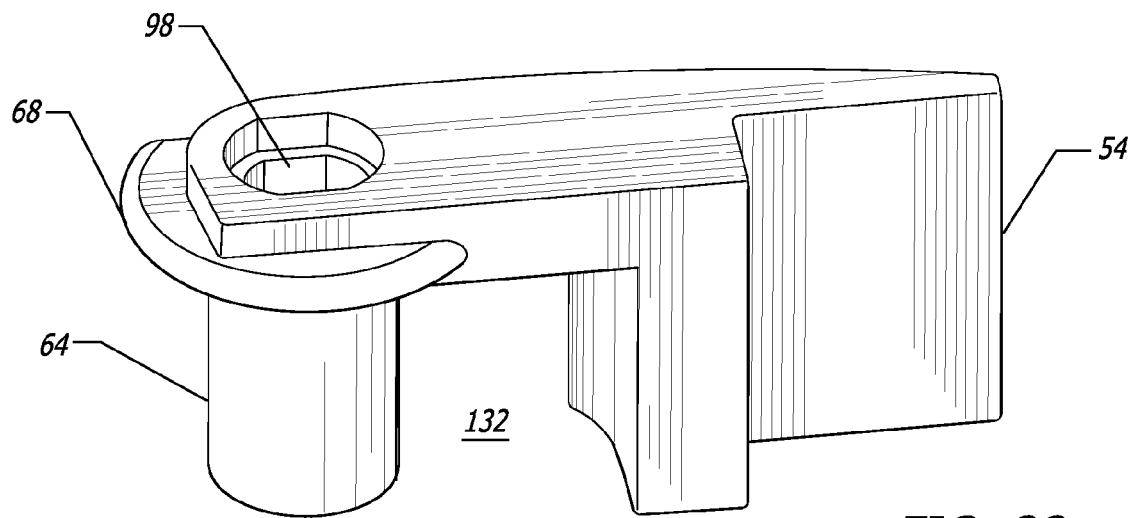
FIG. 22 is a perspective view of the hinge support of the alternate embodiment of FIG. 20.
Figure 23:
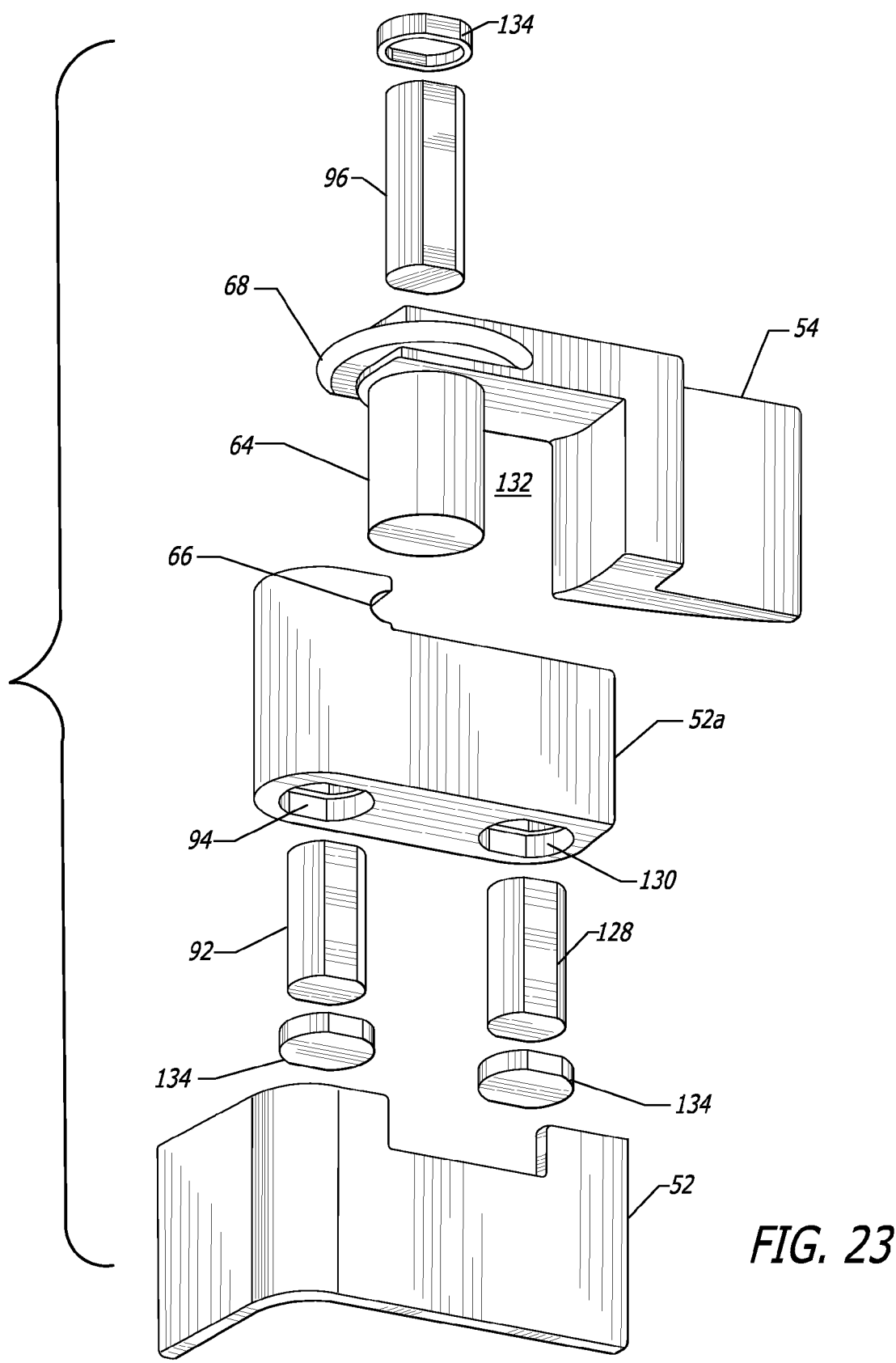
FIG. 23 is an exploded view of the alternate embodiment of the eyewear hinge of FIG. 20.
Figure 24A:
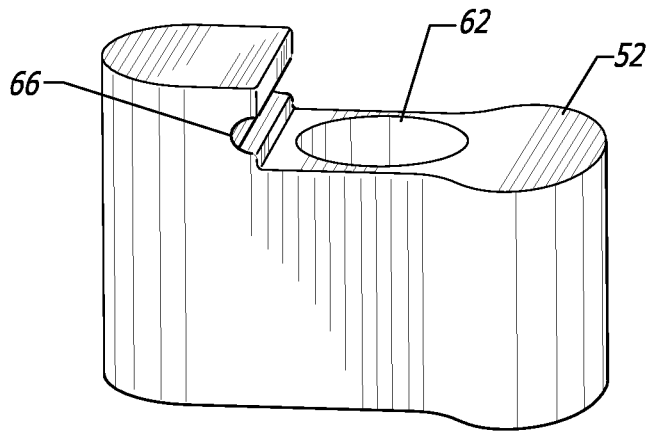
FIG. 24a is a perspective view of a lens mount of another alternate embodiment of the eyewear hinge shown in FIG. 20.
Figure 24B:
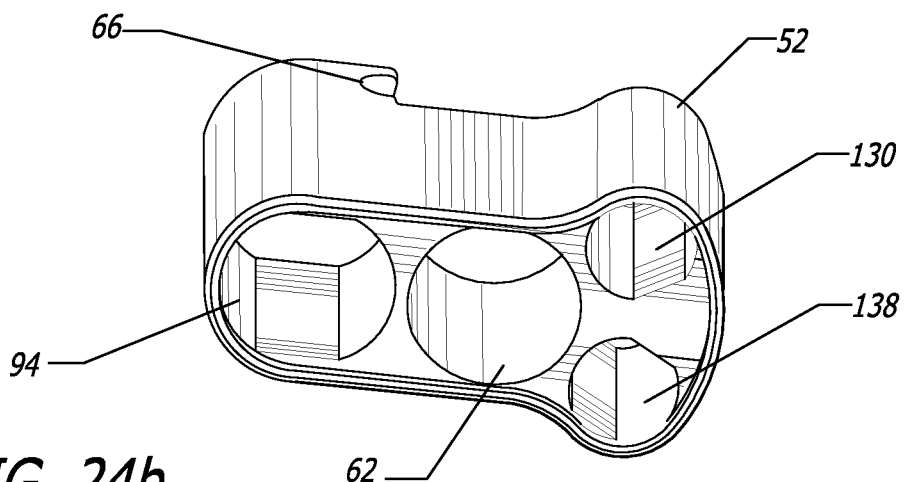
Figure 25:
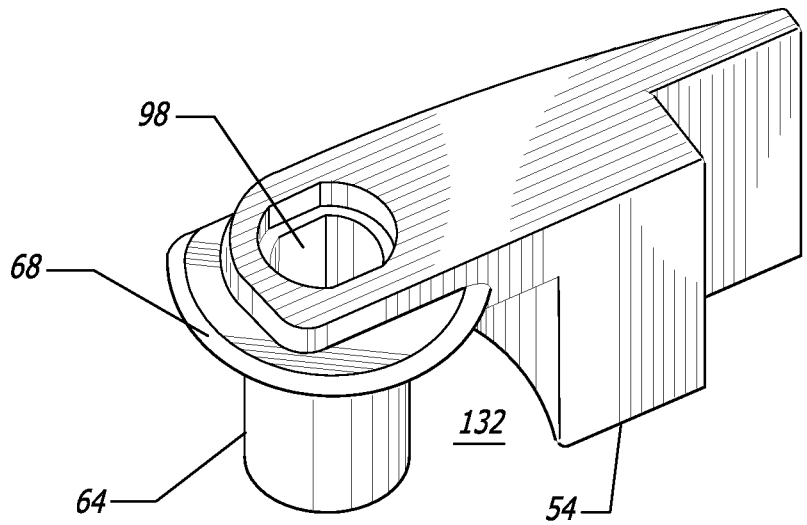
Figure 26:
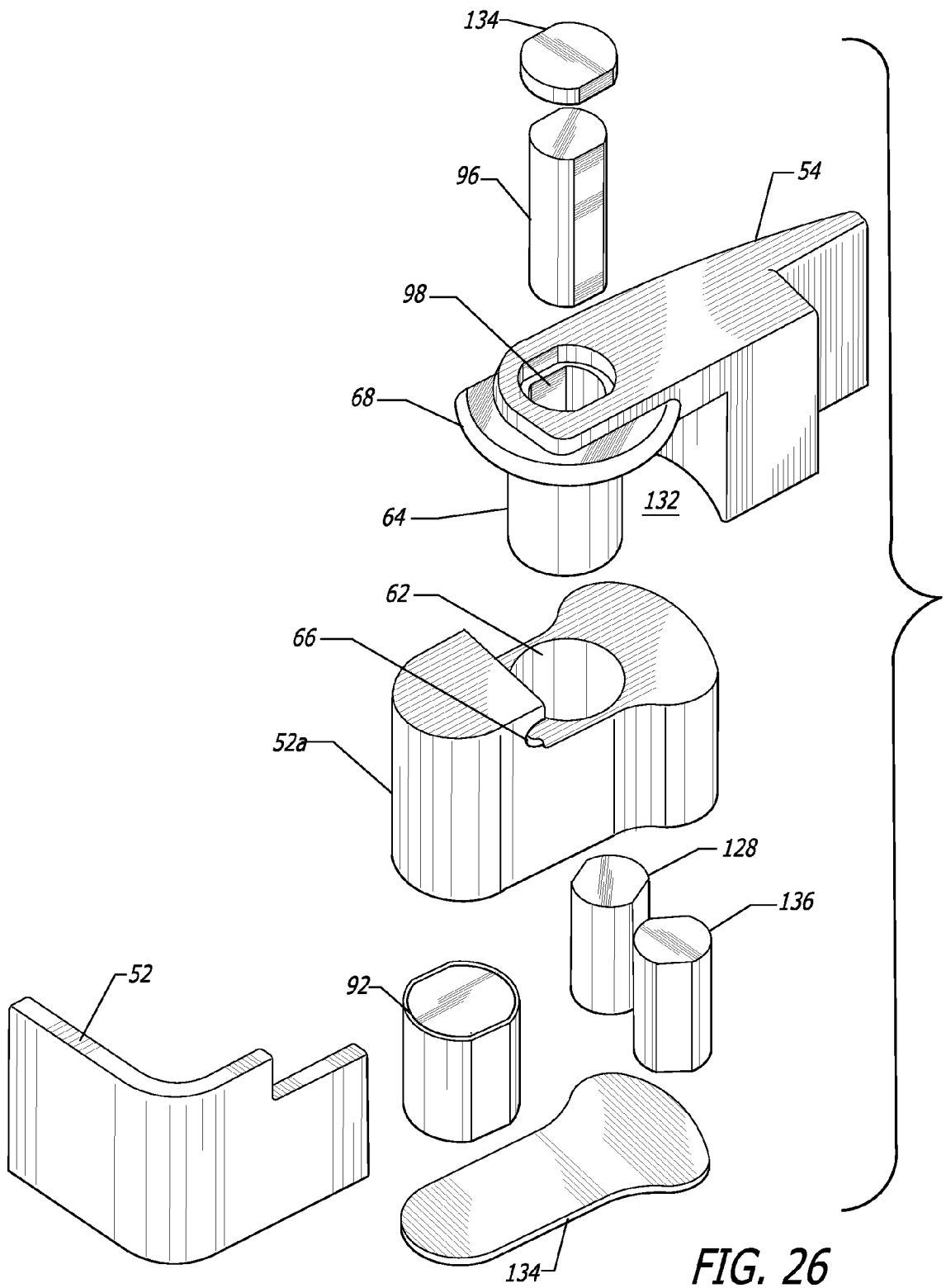
FIG. 26 is an exploded view of the alternate embodiment of the eyewear hinge components shown in FIGS. 24a and 25.

FIG. 20 illustrates an alternate embodiment wherein the lens mount 52 includes two magnetic cartridges surrounding the magnetic cartridge of the hinge support 54. This embodiment includes the first magnetic cartridge 92 and the second magnetic cartridge 96 as described above. A third magnetic cartridge 128 is disposed in a third interior chamber 130 located in the lens mount 52 on the opposite side of the hinge receiver 62 relative to the first interior chamber 94. The hinge support 54 has a similar second interior chamber 98 contained within the hinge post 64 as described above. One can see in FIG. 22 that the hinge support 54 is constructed slightly differently with a clearance gap 132 between the hinge post 64 and the body of the hinge support 54. This clearance gap is necessary to accommodate the additional structure of the lens mount 52 which contains the third interior chamber 130. The assembly and construction of the magnetic cartridges 92, 96, 128 relative to the interior chambers 94, 98, 130 may be similar to that as described above. FIG. 23 illustrates chamber caps 134 configured to seal each of the interior chambers 94, 98, 130 and retain the magnetic cartridges 92, 96, 128 therein. This embodiment may also employ any of the locking means described above.

As described above regarding the polarities of the magnetic cartridges 92, 96, the third magnetic cartridge 128 is preferably positioned such that the polarities of the adjacent poles on the second magnetic cartridge 96 and the third magnetic cartridge 128 will be opposite. In this configuration, the third magnetic cartridge 128 will have an identical rotational polarity configuration as the first magnetic cartridge 92 such that their respective poles are oriented on the same sides.

Figure 27:
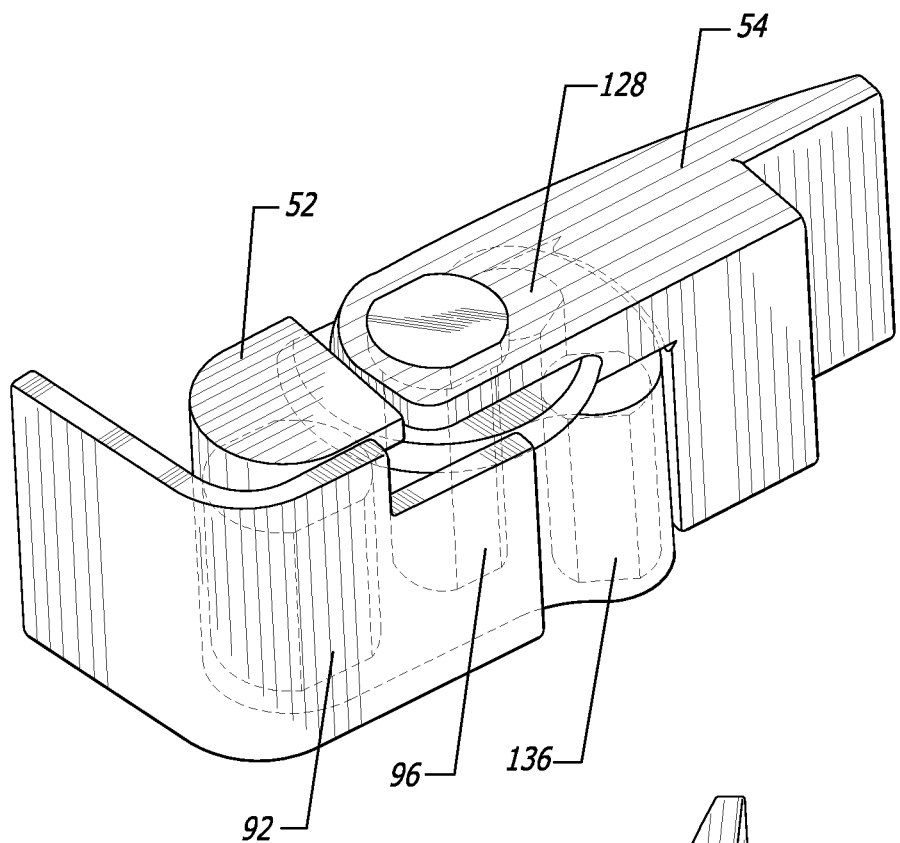
FIG. 27 is a close-up view of the eyewear hinge of FIG. 26, illustrated in the open position.
Figure 28:
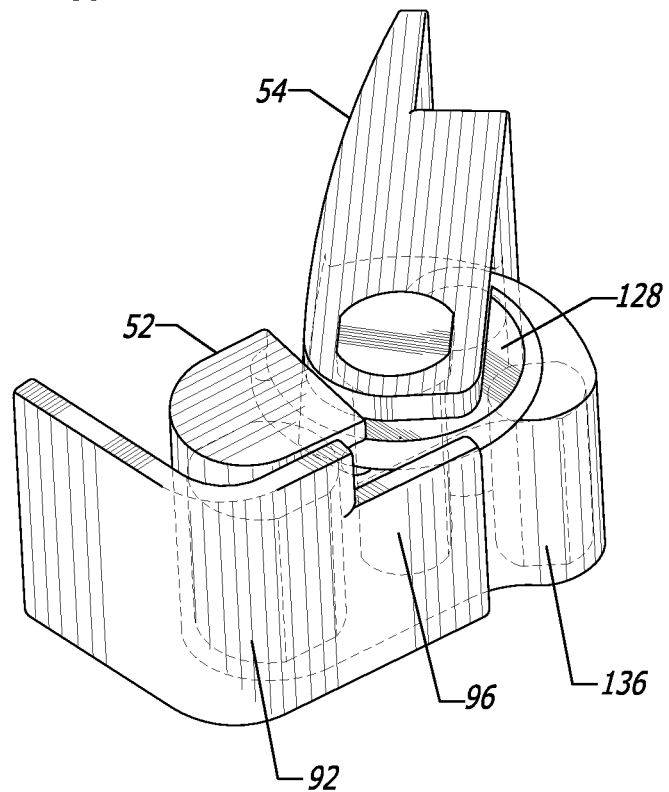
FIG. 28 is a close-up view of the eyewear hinge of FIG. 27, illustrated in a partially closed position.
Figure 29:
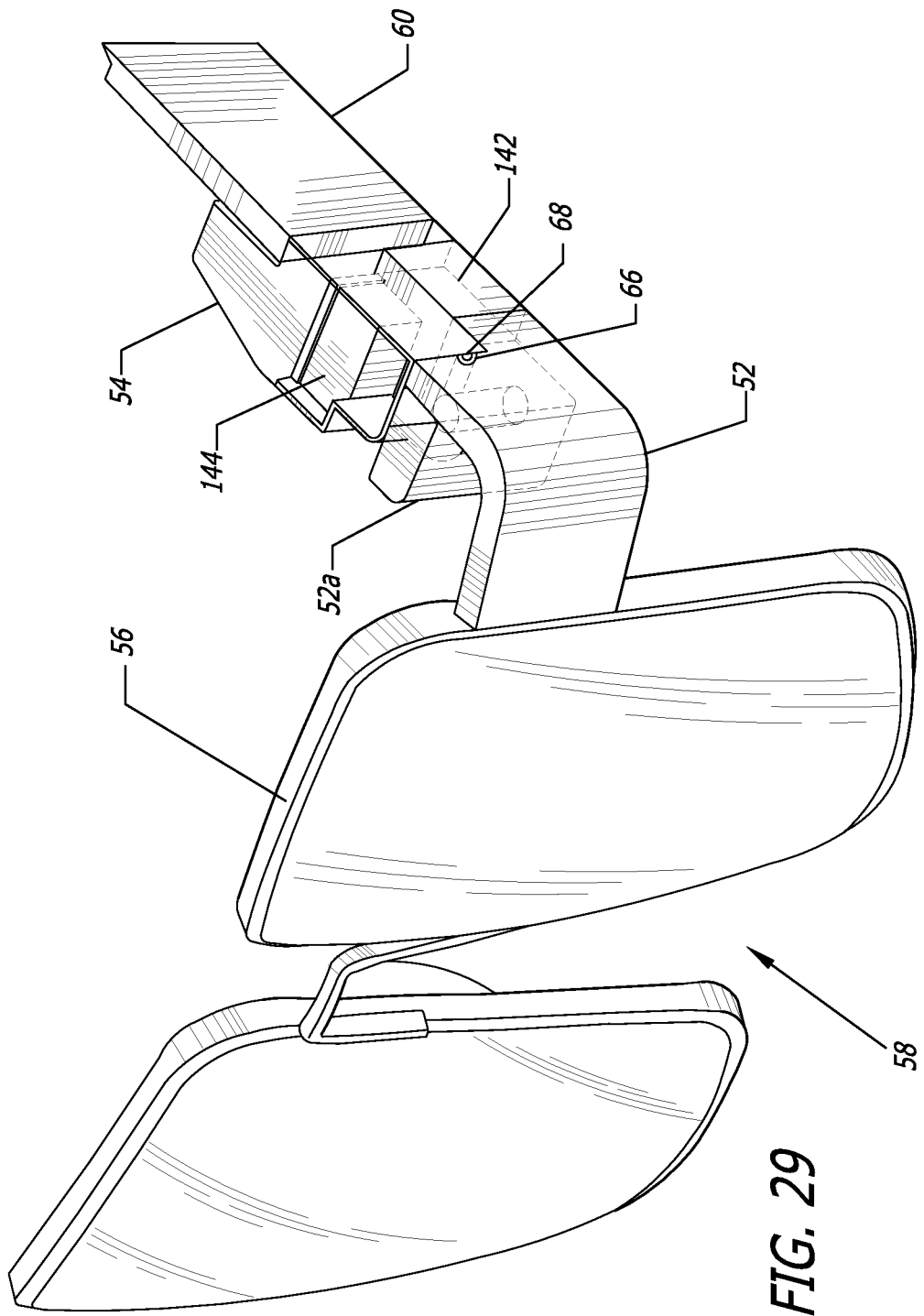
FIG. 29 is a perspective view of an alternate embodiment of the eyewear hinge of the present invention, illustrating lateral rectangular magnets.
Figure 30:
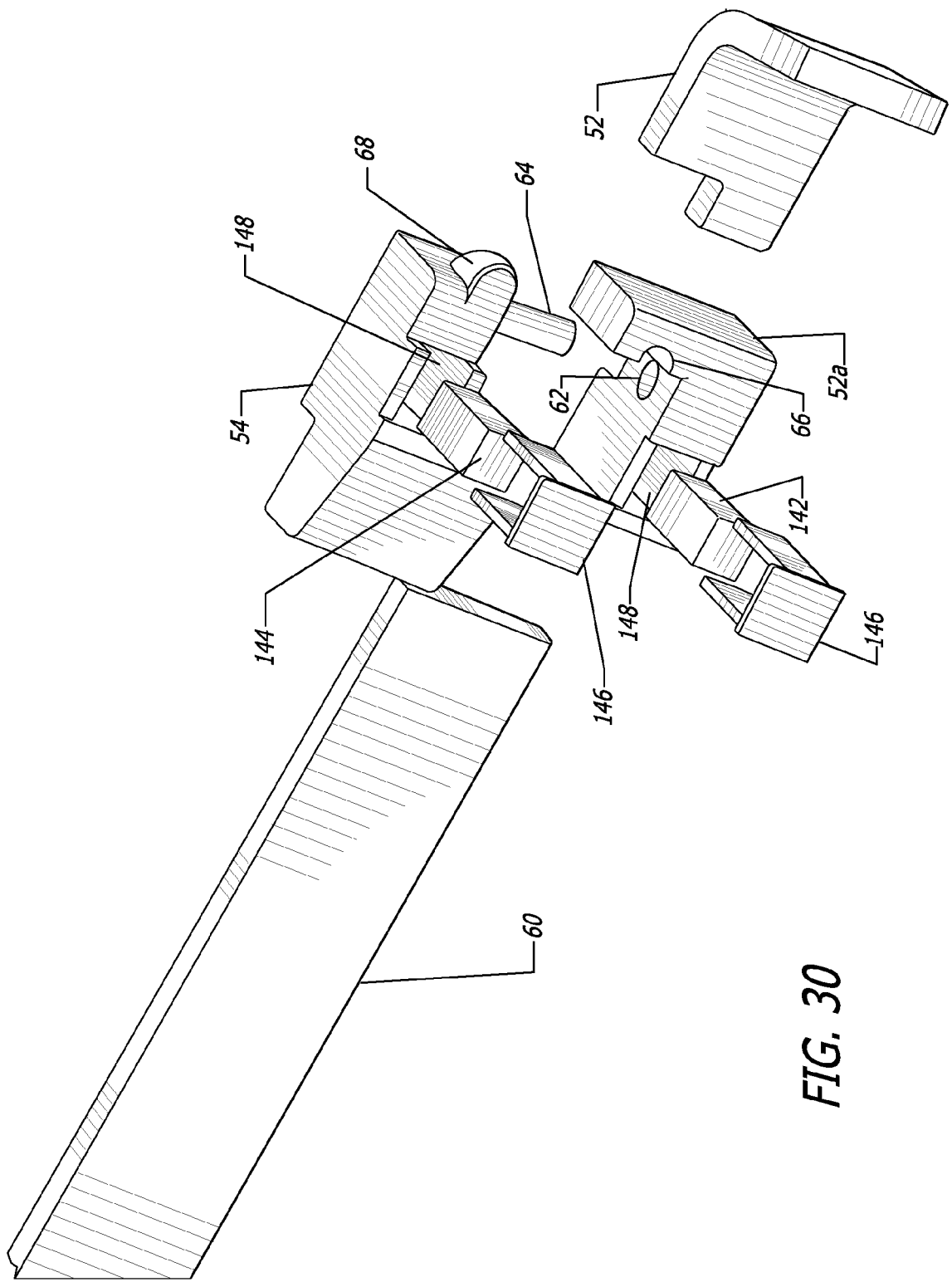
FIG. 30 is an exploded view of the eyewear hinge of FIG. 29.

FIGS. 24a-28 illustrate another alternate embodiment of this eyewear hinge 90. In this embodiment, the lens mount 52 includes a fourth magnetic cartridge 136 disposed in a fourth interior chamber 138. The hinge support 54 has the second magnetic cartridge 96 disposed in the second interior chamber 98 as described above. The hinge support 54 also includes the clearance gap 132 described above. In this embodiment, the third and fourth magnetic cartridges 128, 136 are configured generally with the same polarities adjacent to each other and adjacent to an opposite polarity on the second magnetic cartridge 96 when the eyewear hinge 90 is in the open position 74. The inclusion of three magnetic cartridges in the lens mount 52 provides for a stronger magnetic force to hold the hinge support 54 in the open position 74. FIGS. 27 and 28 illustrate the relative orientations of the poles of the magnetic cartridges 92, 96, 128, 136 as the hinge support 54 is moved from an open position 74 (FIG. 27) in the direction of a closed position (FIG. 28).

FIGS. 29-35 illustrate another alternate embodiment of the eyewear hinge 140 of the present invention. In this embodiment of the eyewear hinge 140, magnetic bodies are horizontally disposed in a superposing relationship in the lens mount 52 and hinge support 54.

The lens mount 52 includes a first magnetic body 142, which is generally rectangular in shape with a long axis disposed laterally across the lens mount 52a. The hinge support 54 contains a second magnetic body 144 that is also generally rectangular in shape with a long axis disposed laterally across the hinge support 54. The first and second magnetic bodies 142, 144 may be presented in other shapes provided that they are both generally similar in shape and possess similar magnetic configurations. The magnetic bodies 142, 144 are preferably disposed such that poles having opposite polarities are generally superposed when the eyewear hinge 140 is in the open position 74. As with the other embodiments described above, this superposition of opposite polarities will provide a magnetic attraction force to help retain the eyewear hinge 140 in the open position 74.

In one particular embodiment, the magnetic bodies 142, 144 may be contained in removable covers 146 that are configured to retain the same in interior chambers 148 located respectively in the lens mount 52a and hinge support 54. The eyewear hinge 140 may omit or include the security slot 66 and security ledge 68 described above.

Figure 31:
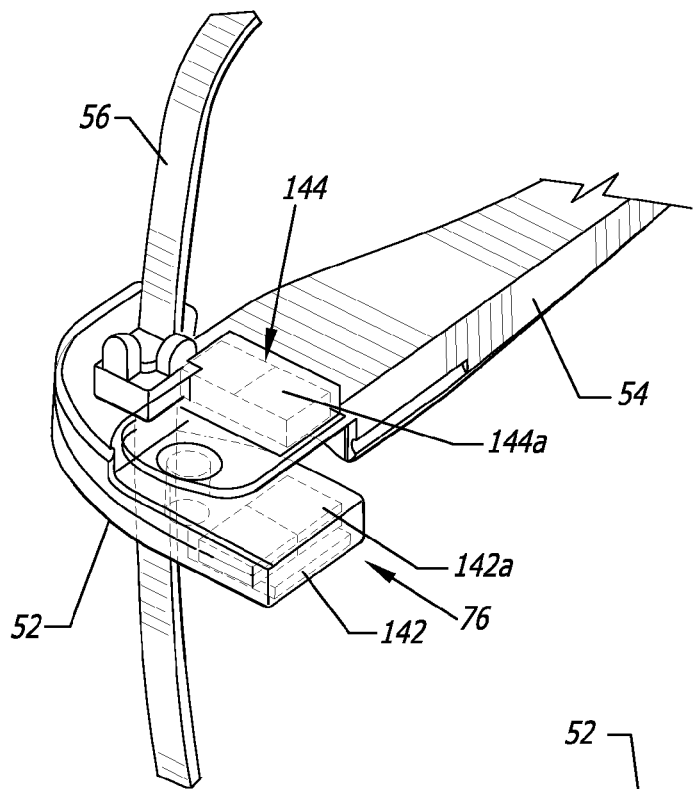
FIG. 31 is a close-up view of the eyewear hinge of FIG. 29, illustrated in a closed position.

As shown in FIG. 31, the first magnetic body 142 and second magnetic body 144 are not superposed in any manner when the eyewear hinge 140 is in the closed position 76. Based upon the described configuration of the polarities of the magnetic bodies 142, 144 the two poles that are closest to each other 142a, 144a are of identical polarity such that they would repel each other and help retain the eyewear hinge 140 in a closed position. Preferably, the magnetic force is strong enough to prevent the eyewear hinge 140 from falling into an open position 74 through the force of gravity. However, a user could easily overcome the repellant magnetic force to move the eyewear hinge 140 in an open position 74.

Figure 32:
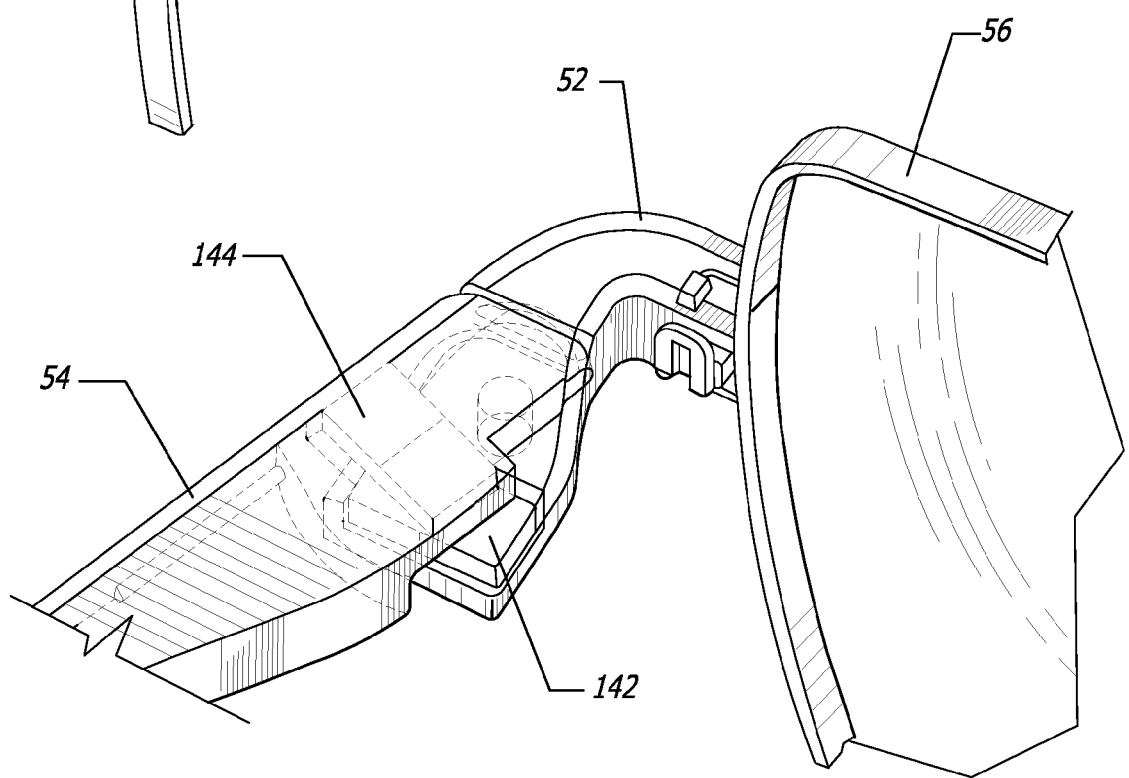
FIG. 32 is a close-up view of the eyewear hinge of FIG. 29 illustrated in an extended open position.

FIG. 32 illustrates a situation in which the eyewear hinge 140 has been pushed beyond the open position 74. In this instance, the attractive force of the magnetic bodies 142, 144 would be sufficient to "snap" the eyewear hinge 140 back into the open position 74 such that the hinge support 54 and earpiece 60 are in an appropriate position for a person to wear the glasses 58.

Figure 33:
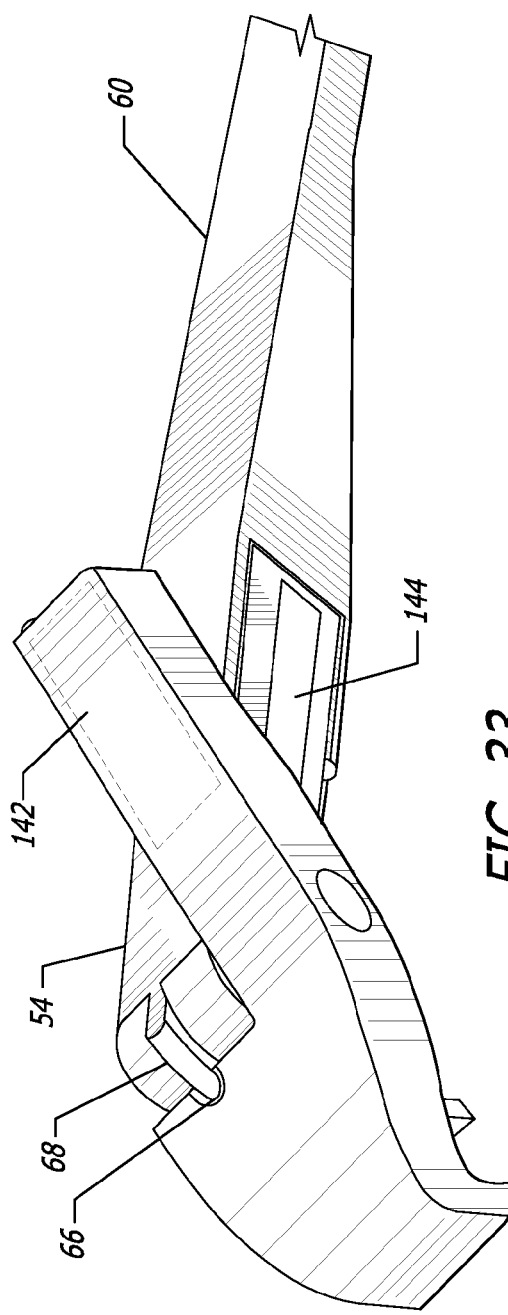
FIG. 33 is a lowered perspective view of an alternate embodiment of the eyewear hinge of the present invention, illustrating longitudinal rectangular magnets.
Figure 34:
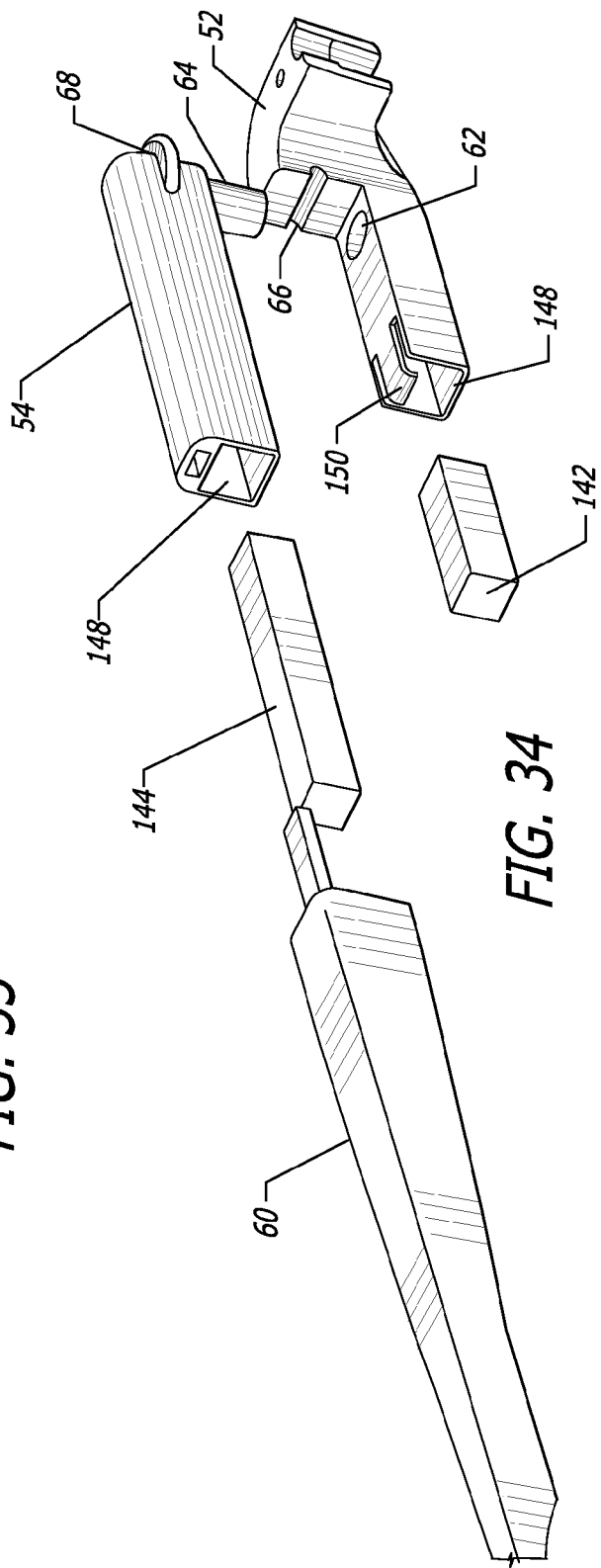
FIG. 34 is an exploded view of the eyewear hinge of FIG. 33.
Figure 35:
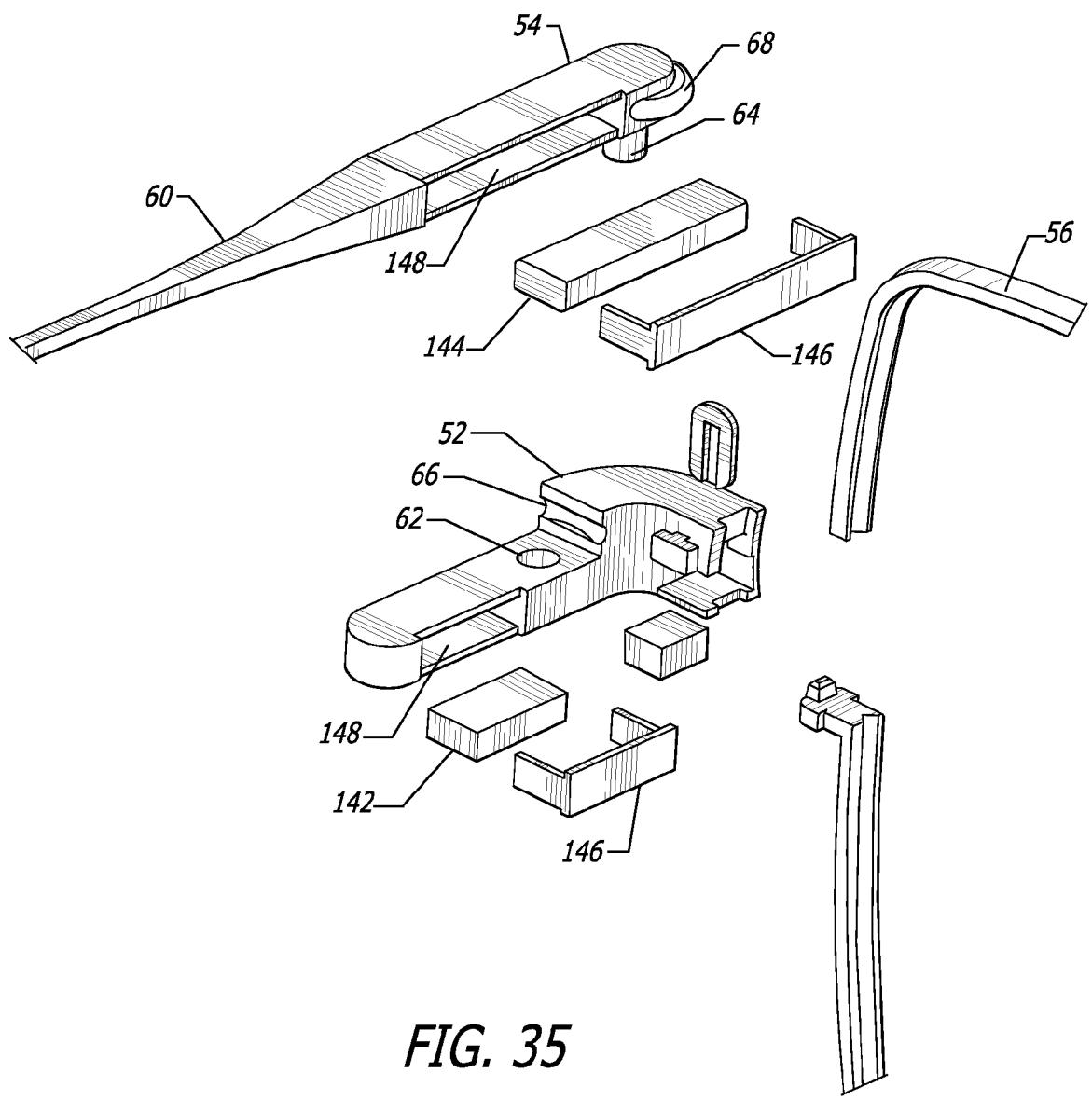
FIG. 35 is an exploded view of an alternate embodiment of the eyewear hinge of FIG. 33.
Figure 36:
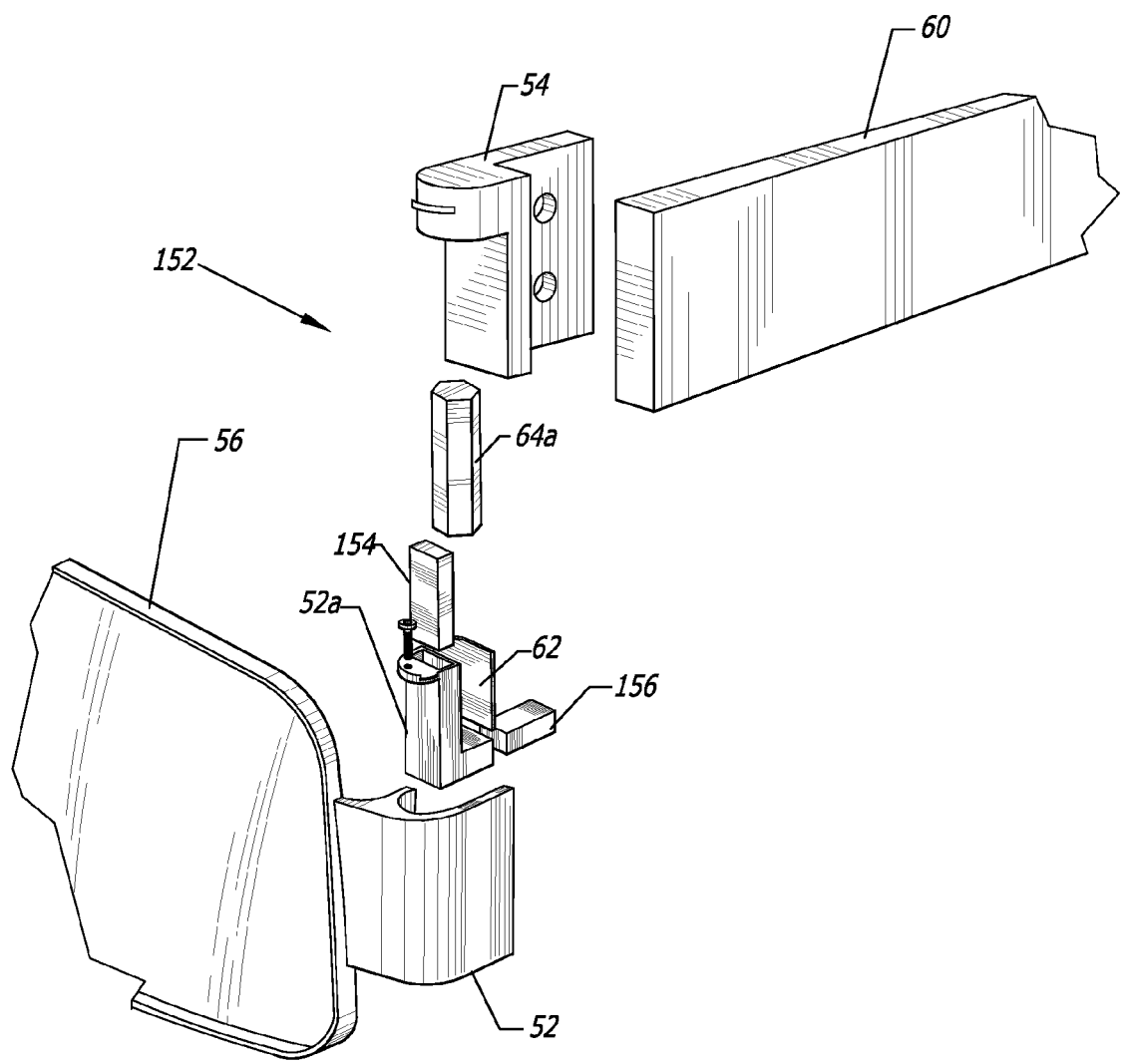
FIG. 36 is an exploded view of an alternate embodiment of the eyewear hinge of the present invention illustrating a hexagonal hinge post.

FIGS. 33 and 34 illustrate yet another embodiment of this eyewear hinge 140 wherein the magnetic bodies 142, 144 are longitudinally disposed within the lens mount 52 and the hinge support 54. In this configuration, the second magnetic body 144 is inserted into an interior chamber 148 on the hinge support 54. The earpiece 60 is then attached to the hinge support 54 in any manner known to those skilled in the art. The first magnetic body 142 is inserted into an interior chamber 148 on the lens mount 52. In this instance, the lens mount 52 includes a retaining clip 150 to securely hold the magnetic body 142 therein. Alternatively, FIG. 35 illustrates another variation of the longitudinally disposed magnetic bodies 142, 144, wherein the same are held within the interior chambers 148 by removable covers 146. The longitudinally disposed magnetic bodies 142, 144 operate in a similar manner to those magnetic configurations described above.

FIGS. 36-40 illustrate another alternate embodiment of the eyewear hinge 152 wherein the hinge post 64a is hexagonal in shape and the hinge receiver 62 is square in shape. The hexagonal hinge post 64a is preferably made from a material that interacts with magnetic fields so as to engage the magnetic bodies disposed within the lens mount 52. As illustrated, the hexagonal hinge post 64a may be removable from the hinge support 54.

Figure 37:
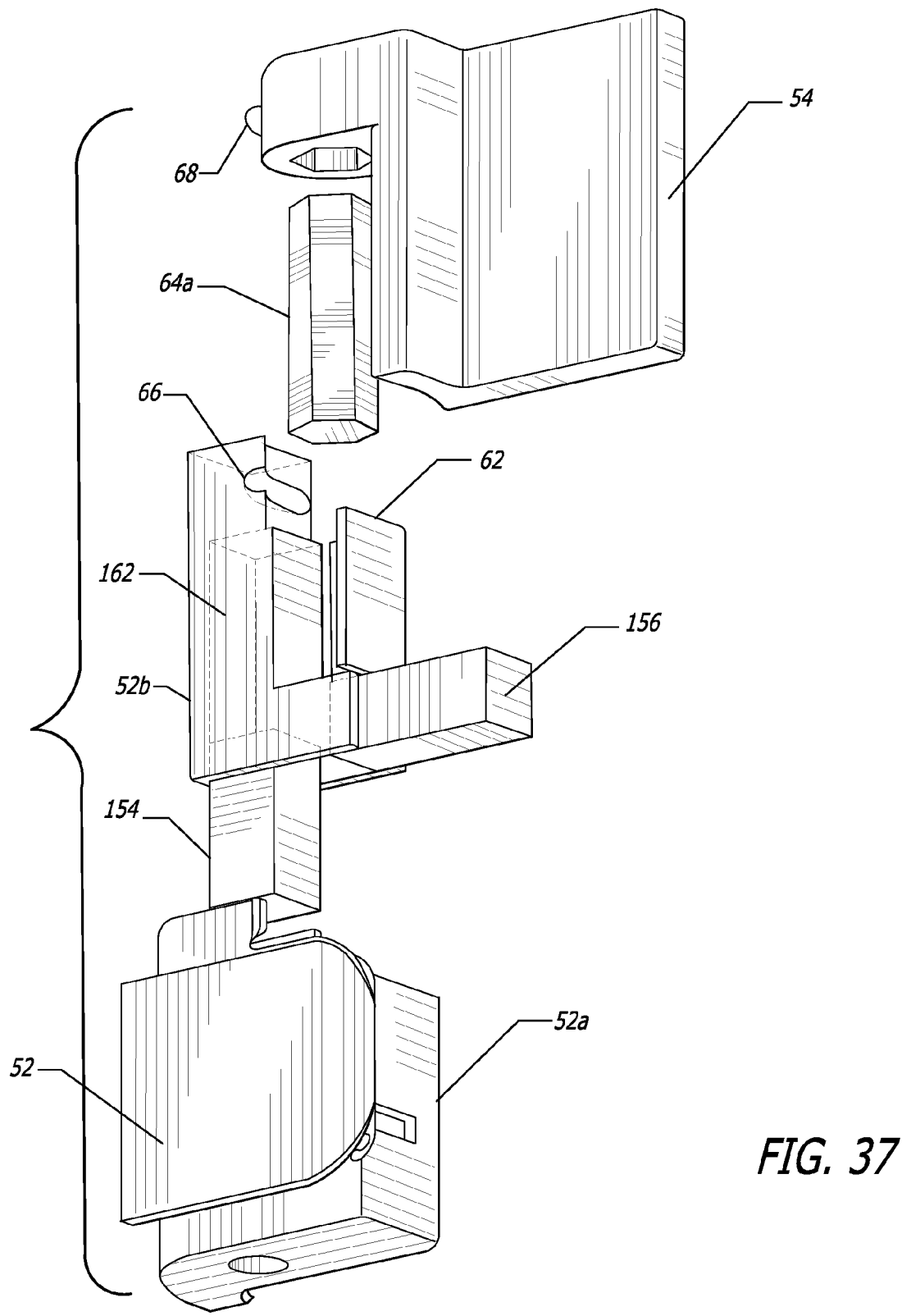
FIG. 37 is another exploded view of the eyewear hinge of FIG. 36.

In this embodiment, the eyewear hinge 152 includes a generally square hinge receiver 62. A vertical magnet 154 is disposed adjacent to the hinge receiver 62 and a horizontal magnet 156 is disposed beneath the hinge receiver 62. This embodiment of the eyewear hinge 152 may or may not include the security slot 66 and security ledge 68 described above. FIG. 37 illustrates a configuration of this embodiment that includes the security slot 66 and security ledge 68.

The magnetic field of the horizontal magnet 156 assists in retaining the hexagonal hinge post 64a in the hinge receiver 62. The vertical magnet 154 attracts one of the multiple sides of the hexagonal hinge post 64a against the side wall of the hinge receiver 62. This attraction by the vertical magnet 154 helps to retain the hinge support 54 in a particular rotation relative to the lens mount 52. Preferably, the hexagonal hinge post 64a and the hinge receiver 62 are sized such that at least two sides of the hexagonal hinge post 64a are in contact with the inner walls of the hinge receiver 62 at all times. The hexagonal hinge post 64a is able to rotate within the hinge receiver 62 because one wall of the hinge receiver 62 allows for a slight outward flexing. The security slot 66 and security ledge 68 may be included in this embodiment 152 and function as described above.

Figure 38:
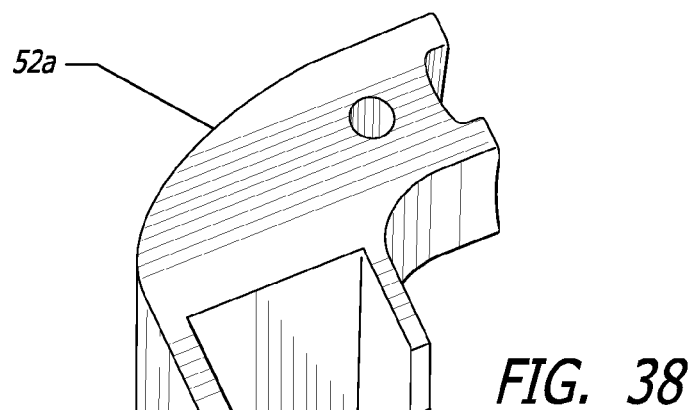
FIG. 38 is a top perspective view of a lens mount of the present invention.
Figure 39:
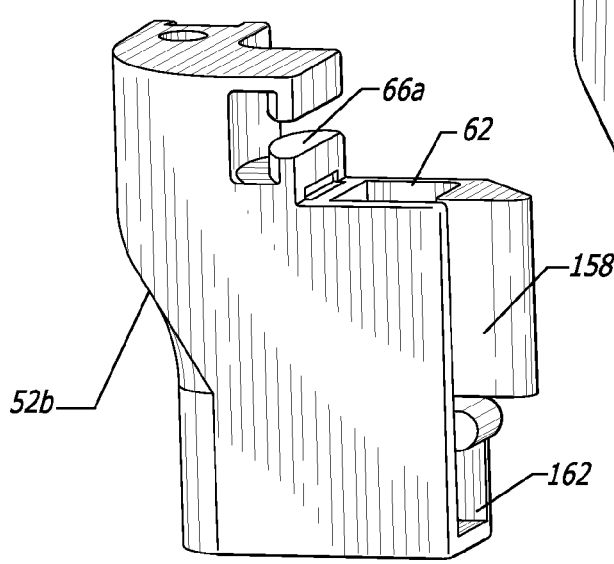
FIG. 39 is a perspective view of a lens mount insert for use with the lens mount base of FIG. 38.

As shown in FIG. 37, the lens mount 52 may include a base 52a separable from the mount 52, as well as, a removable insert 52b configured to be disposed within the base 52a. The removable nature of the insert 52b facilitates the insertion of the vertical magnet 154 and the horizontal magnet 156 and the ultimate assembly of the same with the base 52a. FIGS. 38 and 39 illustrate more clearly the configuration of the base 52a and the insert 52b. As shown in FIG. 38, the base 52a includes a cavity 160 for receipt of the insert 52b. As shown in FIG. 39, the removable insert 52b includes a resilient tab 158, such that when the insert 52b is set in the cavity 160 the resilient tab 158 is pressed slightly inward such that its resilient nature exerts a force on the walls of the cavity 160. The insert 52b further includes an interior chamber 162 configured for receipt of the vertical magnet 154. A corresponding vertical chamber 162 for the horizontal magnet 156 is shown in FIG. 37.

Figure 40:
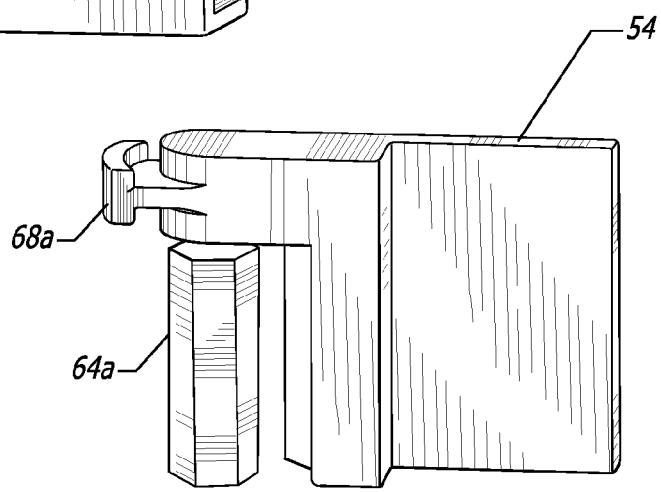
FIG. 40 is a perspective view of an alternate embodiment of a hinge support of the present invention.

FIGS. 39 and 40 illustrate another alternate embodiment of the security slot 66 and security ledge 68. In this embodiment, the security ledge 68 preferably has a T-shaped cross-section such that the security ledge 68a appears as illustrated in FIG. 40. The security slot 66 preferably has a matching T-shaped cross-section such that the security slot 66a appears as illustrated in FIG. 39. This T-shaped cross-section of the slot 66a and ledge 68a provide additional retention force of the hinge support 54 in the lens mount 52 when in the open position 74.

Although several embodiments have been described in detail for purposes of illustration, various modifications may be made without departing from the scope and spirit of the invention. Accordingly, the invention is not to be limited, except as by the appended claims.

What is claimed is:

1. An eyewear hinge for removably connecting an earpiece to a lens frame on eyewear, the eyewear hinge comprising:
    a lens mount fixed to the lens frame and having a hinge receiver and a security slot; and
    a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position;
    wherein the security ledge disengages the security slot when the hinge support is pivoted to a removal position, the removal position corresponds to a discontinuity in the security ledge such that the security ledge is no longer received in or engaged with the security slot, and wherein the discontinuity is configured such that the removal position is beyond the open position.

2. An eyewear hinge for removably connecting an earpiece to a lens frame on eyewear, the eyewear hinge comprising:
    a lens mount fixed to the lens frame and having a hinge receiver and a security slot; and
    a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position;
    wherein the security ledge and security slot have engaging ridges and grooves on facing surfaces so as to securely retain the security ledge within the security slot.

3. The eyewear hinge of claim 2, wherein the engaging ridges and grooves are inclined in their engagement from the closed position to the open position so as to exert a securing force on the security ledge in the security slot.

4. The eyewear hinge of claim 2, wherein the engaging ridges and grooves are on both top and bottom surfaces of the security ledge and the security slot.

5. An eyewear hinge for removably connecting an earpiece to a lens frame on eyewear, the eyewear hinge comprising:
    a lens mount fixed to the lens frame and having a hinge receiver and a security slot;
    a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position; and
    a first magnet cartridge in the lens mount adjacent to the hinge receiver and a second magnet cartridge in the hinge post.

6. The eyewear hinge of claim 5, wherein the first and second magnet cartridges are configured such that opposite polarity poles are adjacent when the hinge support is in the open position.

7. The eyewear hinge of claim 5, further comprising a first means for locking the first magnet cartridge in a predetermined rotational orientation, and a second locking means for locking the second magnet cartridge in an opposite predetermined rotational orientation.

8. The eyewear hinge of claim 7, wherein the first and second means for locking comprise locking slots on the first and second magnet cartridges and matching locking slots on the lens mount and hinge support, both the locking slots and the matching locking slots being configured to receive a locking insert so as to prevent rotation of the first magnet cartridge with respect to the lens mount and the second magnet cartridge with respect to the hinge support.

9. The eyewear hinge of claim 7, wherein the locking means comprises a first set pin extending through the lens mount and engaging a first set hole on the first magnet cartridge, and a second set pin extending through the hinge support and engaging a second set hole on the second magnet cartridge.

10. The eyewear hinge of claim 9, wherein the first and second set pins are screws engaging threads in the first and second set holes.

11. The eyewear hinge of claim 5, further comprising a third magnet cartridge disposed in the lens mount such that the first magnet cartridge and the third magnet cartridge are on opposite sides of the hinge receiver.

12. The eyewear hinge of claim 11, wherein the first and second magnet cartridges are rotationally configured such that poles of opposite polarity are adjacent to one another when the hinge support is in the open position, and the second and third magnet cartridges are rotationally disposed such that poles of opposite polarity are adjacent to one another when the hinge support is in the open position.

13. The eyewear hinge of claim 11, further comprising a fourth magnet cartridge disposed in the lens mount such that the first magnet cartridge is disposed on a first side of the hinge receiver and the third and fourth magnet cartridges are disposed adjacent to one another generally on an opposite second side of the hinge receiver.

14. The eyewear hinge of claim 13, wherein the first and second magnet cartridges are rotationally configured such that poles of opposite polarity are adjacent to one another when the hinge support is in the open position, and the third and fourth magnet cartridges are rotationally disposed with respect to the second magnet cartridge such that poles of identical polarity on the third and fourth magnet cartridges are generally adjacent to one another and generally adjacent to the pole of opposite polarity on the second magnet cartridge when the hinge support is in the open position.

15. An eyewear hinge for removably connecting an earpiece to a lens frame on eyewear, the eyewear hinge comprising:
   a lens mount fixed to the lens frame and having a hinge receiver and a security slot;
   a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position; and
   a first magnet cartridge disposed in the lens mount and a second magnet cartridge disposed in the hinge support, wherein the first and second magnet cartridges are generally superposed when the hinge support is in the open position.

16. The eyewear hinge of claim 15, wherein the first and second magnet cartridges are oriented such that poles having opposite polarities are superposed when the hinge support is in the open position.

17. The eyewear hinge of claim 15, wherein the first and second magnet cartridges are generally rectangular in shape and contained within removable trays disposed within the lens mount and the hinge support.

18. The eyewear hinge of claim 15, wherein the first and second magnet cartridges are generally rectangular with a long axis disposed laterally across the lens mount and the hinge support.

19. The eyewear hinge of claim 15, wherein the first and second magnet cartridges are generally rectangular with a long axis disposed longitudinally along the lens mount and the hinge support.

20. An eyewear hinge for removably connecting an earpiece to a lens frame on eyewear, the eyewear hinge comprising:
   a lens mount fixed to the lens frame and having a hinge receiver and a security slot;
   a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position; and
   a vertical magnet in the lens mount generally adjacent to the hinge receiver and a horizontal magnet also in the lens mount generally beneath the hinge receiver.

21. The eyewear hinge of claim 20, wherein the hinge post is hexagonal in shape and the hinge receiver is square in shape.

22. The eyewear hinge of claim 21, wherein the horizontal magnet retains the hinge post in the bottom of the hinge receiver, and the vertical magnet retains the hinge support in a particular rotation with respect to the lens mount through magnetic attraction of a face of the hexagonal hinge post.

23. An eyewear hinge for removably connecting an earpiece to a lens frame on eyewear, the eyewear hinge comprising:
   a lens mount fixed to the lens frame and having a hinge receiver and a security slot; and
   a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position;
   wherein the security ledge has a generally T-shaped cross-section and the security slot has a matching generally T-shaped cross-section.

24. An eyewear hinge for removably connecting an earpiece to a lens frame on eyewear, the eyewear hinge comprising:
   a lens mount fixed to the lens frame and having a hinge receiver and a security slot; and
   a pivoting hinge support for fixed to the earpiece, the hinge support having a hinge post configured so as to be inserted into the hinge receiver and a security ledge configured to be received in and engaged with the security slot as the hinge support pivots the earpiece between a closed position relative to the lens frame, and an open position;
   wherein the lens mount comprises a secure base and a removable insert therein, the removable insert having the hinge receiver and the security slot.

25. The eyewear hinge of claim 24, wherein the removable insert includes a chamber adjacent to the hinge receiver, the chamber configured so as to receive a magnet cartridge therein.

* * * * *